(12) United States Patent
Nozaki et al.

(10) Patent No.: US 10,414,837 B2
(45) Date of Patent: Sep. 17, 2019

(54) METHOD FOR PRODUCING POLAR GROUP-CONTAINING OLEFIN POLYMER

(71) Applicants: THE UNIVERSITY OF TOKYO, Tokyo (JP); SHOWA DENKO K.K., Tokyo (JP); JAPAN POLYETHYLENE CORPORATION, Tokyo (JP)

(72) Inventors: Kyoko Nozaki, Tokyo (JP); Shingo Ito, Tokyo (JP); Yusuke Ota, Tokyo (JP); Yoshikuni Okumura, Olta (JP); Junichi Kuroda, Olta (JP); Masafumi Koyano, Olta (JP); Minoru Kobayashi, Mie (JP); Hiroyuki Shimizu, Kanagawa (JP)

(73) Assignees: THE UNIVERSITY OF TOKYO, Tokyo (JP); SHOWA DENKO K.K., Tokyo (JP); JAPAN POLYETHYLENE CORPORATION, Tokyo (JP)

( * ) Notice: Subject to any disclaimer, the term of this patent is extended or adjusted under 35 U.S.C. 154(b) by 0 days.

(21) Appl. No.: 15/522,439

(22) PCT Filed: Sep. 15, 2015

(86) PCT No.: PCT/JP2015/076104
§ 371 (c)(1),
(2) Date: Apr. 27, 2017

(87) PCT Pub. No.: WO2016/067776
PCT Pub. Date: May 6, 2016

(65) Prior Publication Data
US 2017/0313792 A1    Nov. 2, 2017

(30) Foreign Application Priority Data
Oct. 28, 2014    (JP) .................. 2014-219219

(51) Int. Cl.
*C08F 4/80* (2006.01)
*C08F 10/02* (2006.01)
*C08F 210/16* (2006.01)

(52) U.S. Cl.
CPC ............ *C08F 10/02* (2013.01); *C08F 4/80* (2013.01); *C08F 210/16* (2013.01)

(58) Field of Classification Search
CPC ............ C08F 4/70; C08F 4/80; C08F 210/02
See application file for complete search history.

(56) References Cited

U.S. PATENT DOCUMENTS 8,889,805 B2 * 11/2014 Ito .................. C07D 213/24
526/169.1
8,916,663 B2 * 12/2014 Nozaki ............... C08F 210/02
526/161
9,303,101 B2 * 4/2016 Nozaki ................... C08F 4/80
9,499,644 B2 * 11/2016 Ito ..................... C07F 15/0066
2012/0116030 A1   5/2012 Hepperle et al.
2012/0116036 A1 *  5/2012 Nozaki ................ C08F 210/02
526/171
2015/0004344 A1   1/2015 Abe et al.
(Continued)

FOREIGN PATENT DOCUMENTS

JP    2011-68881 A      4/2011
JP    2011-88831 A      5/2011
JP    2011-256167 A  *  12/2011 ............... C07F 9/50
(Continued)

OTHER PUBLICATIONS

JP 2011-256167 A (Dec. 22, 2011); machine translation. (Year: 2011).*
Ito, S.; Kanazawa, M.; Munakata, K.; Kuroda, J.; Okumura, Y.; Nozaki, K. J. Am. Chem. Soc. 2011, 133, 1232-1235. (Year: 2011).*
Ota, Y.; Ito, S.; Kuroda, J.; Okumura, Y.; Noxaki, K. J. Am. Chem. Soc. 2014, 136, 11898-11901 (Year: 2014).*
(Continued)

*Primary Examiner* — Rip A Lee
(74) *Attorney, Agent, or Firm* — Sughrue Mion, PLLC

(57) ABSTRACT

The present invention relates to a method for producing a copolymer of ethylene and a polar group-containing olefin using as a catalyst a metal complex of group 10 elements having a structure represented by formula (C4) and (C5)

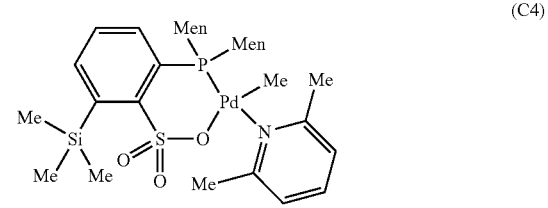

(C4)

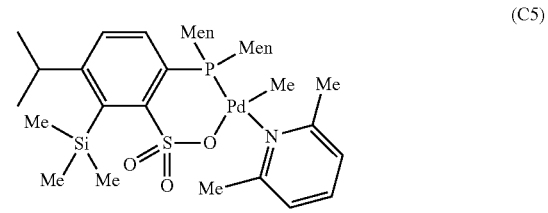

(C5)

(in the formula, "Men" represents a menthyl group and "Me" represents a methyl group). The method of the present invention makes it possible to produce a polar group-containing olefin polymer available for various applications, as being a high molecular weight body, which has been difficult to produce, and to produce the polymer in a molecular weight range such that the polymer has good moldability.

11 Claims, No Drawings

(56) References Cited

U.S. PATENT DOCUMENTS

2015/0051361 A1  2/2015  Nozaki et al.
2015/0368376 A1  12/2015  Ito et al.

FOREIGN PATENT DOCUMENTS

| | | | |
|---|---|---|---|
| JP | 2012-201673 A | 10/2012 | |
| JP | 2012-229190 A | 11/2012 | |
| JP | 2012-236824 A | 12/2012 | |
| JP | 2013-147644 A | 8/2013 | |
| WO | WO-2011025053 A2 * | 3/2011 | ............ C08F 210/02 |
| WO | 2014115895 A1 | 7/2014 | |
| WO | WO-2014115895 A1 * | 7/2014 | .......... C07F 15/0066 |

OTHER PUBLICATIONS

Communication dated May 22, 2018, from the European Patent Office in counterpart European Application No. 15856157.1.

Yusuke Ota, et al., "Quantification of the Steric Influence of Alkylphosphine-Sulfonate Ligands on Polymerization, Leading to High-Molecular-Weight Copolymers of Ethylene and Polar Monomers", Journal of the American Chemical Society, vol. 136, No. 34, Aug. 27, 2014, pp. 11898-11901, XP055472456.

Shingo Ito, et al., "Coordination-Insertion Copolymerization of Allyl Monomers with Ethylene", Journal of the American Chemical Society, Jan. 4, 2011, pp. 1232-1235, vol. 133.

International Search Report of PCT/JP2015/076104, dated Nov. 24, 2015. [PCT/ISA/210].

* cited by examiner

METHOD FOR PRODUCING POLAR GROUP-CONTAINING OLEFIN POLYMER

CROSS REFERENCE TO RELATED APPLICATIONS

This application is a National Stage of International Application No. PCT/JP2015/076104 filed Sep. 15, 2015, claiming priority based on Japanese Patent Application No. 2014-219219, filed Oct. 28, 2014, the contents of all of which are incorporated herein by reference in their entirety.

TECHNICAL FIELD

The present invention relates to a catalyst for polymerization of olefin, and a method for producing olefin polymers, specifically a method for producing polymers of polar group-containing monomers such as a polar group-containing allyl compound and the like.

BACKGROUND ART

Copolymers of olefin such as ethylene and propylene which is a nonpolar monomer and a vinyl monomer containing polar group have been widely known. Specifically, ethylene-vinyl alcohol copolymers (EVOH) are random copolymer comprising ethylene and vinyl alcohol and synthesized by saponifying ethylene-vinyl acetate copolymers obtained by radical copolymerization of ethylene and vinyl acetate. EVOH is used in a wide range of fields for purposes such as food packages by taking advantage of its excellent gas barrier property.

The polymerization of monomers containing allyl group is more difficult compared to that of vinyl monomers, and the polymer of allyl group-containing monomers has been almost unheard. The main reason for this is that when allyl group-containing monomers are subjected to radical polymerization, the polymer propagation reaction proceeds very slowly due to the degradative chain transfer reaction to monomers and hence only oligomers having low degree of polymerization can be obtained (Chem. Rev. 58, 808 (1958)).

JP 2011-68881 A (International Publication No. WO 2011/025053; Patent Document 1) and J. Am. Chem. Soc., 133, 1232 (2011) (Non-patent Document 1) disclose coordination copolymerization of ethylene and polar group-containing allyl monomers using a catalyst of metal complex of group 10 elements in the periodic system, and polymers of polar group-containing allyl monomers are synthesized, which have not been obtained by a radical polymerization method. However, the weight average molecular weight (Mw) of the obtained polymer was about several thousands to several tens of thousands when calculated by employing polystyrene as an internal standard substance, and it has been difficult to obtain a polymer having an Mw around 100,000 to 500,000, which is suitable in terms of film formability and transparency.

PRIOR ART

Patent Document

[Patent Document 1] JP 2011-68881 A (WO 2011/025053)

Non-Patent Document

[Non-patent Document 1] J. Am. Chem. Soc., 133, 1232 (2011)

SUMMARY OF THE INVENTION

Problems to be Solved by the Invention

An objective of the present invention is to provide a method for producing a polar group-containing olefin polymer available for various applications, as being a high molecular weight polymer, which has been difficult to produce, and to produce the polymer in a molecular weight range such that the polymer has good moldability.

Means to Solve the Problem

As a result of intensive studies to solve the above-mentioned problem, the present inventors have found that a polar group-containing olefin polymer, which is available for various applications, can be provided with a molecular weight range such that the polymer has good moldability, by polymerizing vinyl monomers (non-polar olefin) such as ethylene and propylene solely or copolymerizing the non-polar olefin and a polar group-containing olefin (including polar group-containing allyl monomers) using a novel metal complex of group 10 elements as a catalyst, and accomplished the present invention.

That is, the present invention relates to the catalyst in [1], and the method for producing polymers in [2] to [13] described below:

[1] A catalyst for polymerization of olefin, containing a metal complex represented by formula (C1)

(in the formula, M represents a metal atom of group 10 element in the periodic system; X represents a phosphorous (P) atom or an arsenic (As) atom; $Y^1$ represents a bivalent hydrocarbon group having 1 to 70 carbon atoms which is substituted by at least one silyl group and may be substituted by one or more groups selected from a halogen atom, silyl group, alkoxy group and aryloxy group; Q represents a bivalent group indicated in the brackets of $Y^1[—S(=O)_2—O-]M$, $Y^1[—C(=O)—O—]M$, $Y^1[—P(=O)(—OH)—O-]M$ or $Y^1[—S-]M$ ($Y^1$ and M at the beginning and at the end of the formulae are described to show the coupling direction of the groups); $R^5$ represents a substituent group selected from a group consisting of a hydrogen atom, a halogen atom, a hydrocarbon group having 1 to 30 carbon atoms, a hydrocarbon group having 1 to 30 carbon atoms substituted by a halogen atom, a hydrocarbon group having 2 to 30 carbon atoms substituted by an alkoxy group having 1 to 10 carbon atoms, a hydrocarbon group having 7 to 30 carbon atoms substituted by an aryloxy group having 6 to 20 carbon atoms, a hydrocarbon group having 3 to 30 carbon atoms substituted by an amide group having 2 to 10 carbon atoms, an alkoxy group having 1 to 30 carbon atoms, an aryloxy group having 6 to 30 carbon atoms, and an acyloxy group having 2 to 10 carbon atoms; $R^6$ and $R^7$ independently represent a hydrogen atom, alkoxy group, aryloxy group, silyl group, amino group or hydrocarbon group having 1 to 120 carbon atoms which may be substituted by one or more groups selected from a halogen atom, alkoxy group and aryloxy group; and at least one of $R^6$ and $R^7$ represents an alkyl group having 1 to 10 carbon atoms or a cycloalkyl group having 4 to 106 carbon atoms. $R^6$ or $R^7$ may bond to $Y^1$ to form a ring structure. L represents an electron-donating ligand and q is 0, ½, 1 or 2).

[2] A method for producing a homopolymer of ethylene, or a copolymer of ethylene and a monomer comprising a polar group-containing olefin represented by formula (1)

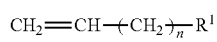
(1)

(in the formula, $R^1$ represents a substituent group selected from a group consisting of a hydroxyl group, an alkoxy group having 1 to 10 carbon atoms, an aryloxy group having 6 to 20 carbon atoms, an acyl group having 2 to 10 carbon atoms, an ester group having 2 to 10 carbon atoms, an acyloxy group having 2 to 10 carbon atoms, an amino group, a substituted amino group having 1 to 12 carbon atoms, a substituted amide group having 2 to 12 carbon atoms, a substituted pyridyl group having 5 to 10 carbon atoms, a substituted pyrrolidyl group having 4 to 10 carbon atoms, a substituted piperidyl group having 5 to 10 carbon atoms, a substituted hydrofuryl group having 4 to 10 carbon atoms, a substituted imidazolyl group having 4 to 10 carbon atoms, a mercapto group, an alkylthio group having 1 to 10 carbon atoms, an arylthio group having 6 to 10 carbon atoms, an epoxy group, and a halogen atom. n is 0 and an arbitrary integer selected from 1 to 6.) (note that the ratio of ethylene to the total of propylene and ethylene contained in the polymer is 60 mol % or higher) using as a polymerization catalyst a metal complex represented by formula (C1) (in the formula, symbols have the same meanings as described in [1] above).

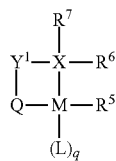
(C1)

[3] The method for producing a polymer as described in [2] above, wherein n in formula (1) is 0.
[4] The method for producing a polymer as described in [2] above, wherein n in formula (1) is 1.
[5] The method for producing a polymer as described in [2] above, wherein the copolymer is a copolymer of ethylene, a polar group-containing olefin represented by formula (1) and α-olefin represented by formula (2)

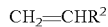
(2)

(in the formula, $R^2$ represents a hydrocarbon group having 1 to 20 carbon atoms); and the molar ratios of 1, m and p of the monomer unites represented by formula (3), formula (4) and formula (5) each corresponding to ethylene, a monomer represented by formula (1) and a monomer represented by formula (2) satisfies the relationship expressed by the following equation: $\{l/(l+p)\} \times 100 \geq 60$.

(3)

(4)

(5)

[6] The method for producing a polymer as described in any one of [2] to [5] above, wherein Q in formula (C1) represents —S(=O)$_2$—O— (provided that S bonds to $Y^1$ and O bonds to M).
[7] The method for producing a polymer as described in any one of [2] to [6] above, wherein the metal complex represented by formula (C1) is represented by formula (C2)

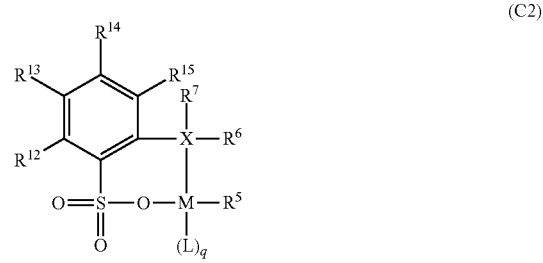
(C2)

(in the formula, $R^{12}$ to $R^{15}$ represents a hydrogen atom, a silyl group, a halogen atom, a hydrocarbon group having 1 to 20 carbon atoms, an alkoxy group having 1 to 8 carbon atoms, an aryloxy group having 6 to 20 carbon atoms, and a hydrocarbon group having 1 to 20 carbon atoms substituted by a silyl group or a halogen atom. At least one of $R^{12}$ to $R^{15}$ is a silyl group. M, $R^5$, $R^6$, $R^7$, L and q have the same meanings as described in formula (C1)).
[8] The method for producing a polymer as described in [7] above, wherein formula (C2) is represented by formula (C3), in which $R^{12}$ in formula (C2) is a silyl group

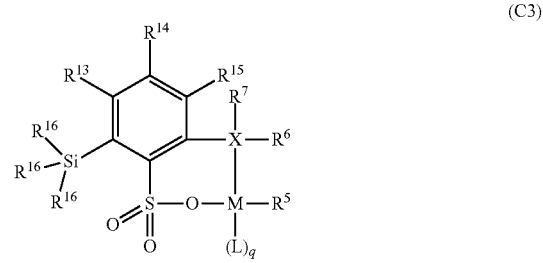
(C3)

(in the formula, three $R^{16}$'s independently represent a hydrogen atom or a hydrocarbon group having 1 to 8 carbon atoms and may be the same or different from each other. M, X, $R^5$, $R^6$, $R^7$, $R^{13}$, $R^{14}$, $R^{15}$, L and q have the same meanings as described in formula (C1)).

[9] The method for producing a polymer as described in [8] above, wherein all the $R^{16}$'s in formula (C3) are a methyl group.

[10] The method for producing a polymer as described in [8] or [9] above, wherein $R^{13}$ in formula (C3) is a hydrogen atom or a hydrocarbon group having 1 to 6 carbon atoms.

[11] The method for producing a polymer as described in any one of [8] to [10] above, wherein $R^{13}$ in formula (C3) is a hydrogen atom, isopropyl group or phenyl group.

[12] The method for producing a polymer as described in any one of [8] or [11] above, wherein both of $R^{14}$ and $R^{15}$ in formula (C3) are a hydrogen atom.

[13] A method for producing a hydroxyl group-containing copolymer using the production method described in any one of [2] to [12] above, comprising producing a copolymer from ethylene and a polar group-containing olefin, in which $R^1$ in formula (1) is an acyloxy group having 2 to 10 carbon atoms and subjecting the copolymer to a saponification reaction or a hydrolysis reaction.

Effects of the Invention

A polar group-containing copolymer, which has been difficult to produce, can be produced as being a high molecular weight body and in a molecular weight range such that the polymer has good moldability by the method of the present invention, wherein a polar group-containing olefin comprising a polar group-containing allyl monomer and non-polar olefin are copolymerized using a metal complex of group 10 elements in the periodic system as a catalyst.

MODE FOR CARRYING OUT THE INVENTION

[Catalyst]

The (structure of) the catalyst comprising metal complex of group 10 elements in the periodic system used in the present invention is represented by formula (C1).

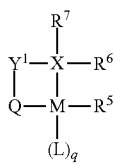

(C1)

(in the formula, M represents a metal atom of group 10 element in the periodic system; X represents a phosphorous atom (P) or an arsenic atom (As); $Y^1$ represents a bivalent hydrocarbon group having 1 to 70 carbon atoms which is substituted by at least one silyl group and may be substituted by one or more groups selected from a halogen atom, silyl group, alkoxy group and aryloxy group; Q represents a bivalent group indicated in the brackets of Y [—S(=O)$_2$—O-]M, $Y^1$[—C(=O)—O-]M, $Y^1$[—P(=O)(—OH)—O-]M or $Y^1$[—S-]M ($Y^1$ and M at the beginning and at the end of the formulae are described to show the coupling direction of the groups); $R^5$ represents a substituent group selected from a group consisting of a hydrogen atom, a halogen atom, a hydrocarbon group having 1 to 30 carbon atoms, a hydrocarbon group having 1 to 30 carbon atoms substituted by a halogen atom, a hydrocarbon group having 2 to 30 carbon atoms substituted by an alkoxy group having 1 to 10 carbon atoms, a hydrocarbon group having 7 to 30 carbon atoms substituted by an aryloxy group having 6 to 20 carbon atoms, a hydrocarbon group having 3 to 30 carbon atoms substituted by an amide group having 2 to 10 carbon atoms, an alkoxy group having 1 to 30 carbon atoms, an aryloxy group having 6 to 30 carbon atoms, and an acyloxy group having 2 to 10 carbon atoms; $R^6$ and $R^7$ independently represent a hydrogen atom, alkoxy group, aryloxy group, silyl group, amino group or hydrocarbon group having 1 to 120 carbon atoms which may be substituted by one or more groups selected from a halogen atom, alkoxy group and aryloxy group; and at least one of $R^6$ and $R^7$ represents an alkyl group having 1 to 10 carbon atoms or a cycloalkyl group having 4 to 106 carbon atoms. $R^6$ or $R^7$ may bond to $Y^1$ to form a ring structure. L represents an electron-donating ligand and q is 0, ½, 1 or 2.

In the present description, a "hydrocarbon" includes saturated and unsaturated aliphatic hydrocarbons and aromatic hydrocarbons.

The structure of formula (C1) is described below.

M represents an element of group 10 in the periodic system. The elements of group 10 in the periodic system include Ni, Pd and Pt. From the viewpoint of the catalytic activity and molecular weight of the obtained polymers, Ni and Pd are preferable, and Pd is particularly preferable.

X represents a phosphorous (P) atom or an arsenic (As) atom, wherein two electrons coordinate to metal center M. P is preferred as X for reasons of availability and the catalyst cost.

$R^5$ represents a substituent group selected from a group consisting of a hydrogen atom, a halogen atom, a hydrocarbon group having 1 to 30 carbon atoms, a hydrocarbon group having 1 to 30 carbon atoms substituted by a halogen atom, a hydrocarbon group having 2 to 30 carbon atoms substituted by an alkoxy group having 1 to 10 carbon atoms, a hydrocarbon group having 7 to 30 carbon atoms substituted by an aryloxy group having 6 to 20 carbon atoms, a hydrocarbon group having 3 to 30 carbon atoms substituted by an amide group having 2 to 10 carbon atoms, an alkoxy group having 1 to 30 carbon atoms, an aryloxy group having 6 to 30 carbon atoms, and an acyloxy group having 2 to 10 carbon atoms.

Specific preferred examples of a halogen atom represented by $R^5$ is a fluorine atom, a chlorine atom, and a bromine atom. Among these, a more preferable substituent is a chlorine atom.

A hydrocarbon group having 1 to 30 carbon atoms represented by $R^5$ is preferably a hydrocarbon group having 1 to 13 carbon atoms, and an alkyl group, a cycloalkyl group or an aryl group.

Preferred examples thereof include a methyl group, an ethyl group, a 1-propyl group, a 1-butyl group, a 1-pentyl group, a 1-hexyl group, a 1-heptyl group, a 1-octyl group, a 1-nonyl group, a 1-decyl group, a t-butyl group, a tricyclohexylmethyl group, a 1,1-dimethyl-2-phenylethyl group, an isopropyl group, a 1-dimethylpropyl group, a 1,1,2-trimethylpropyl group, a 1,1-diethylpropyl group, a 1-phenyl-2-propyl group, an isobutyl group, a 1,1-dimethylbutyl group, a 2-pentyl group, a 3-pentyl group, a 2-hexyl group, a 3-hexyl group, a 2-ethylhexyl group, a 2-heptyl group, a 3-heptyl group, a 4-heptyl group, a 2-propylheptyl group, a 2-octyl group, a 3-nonyl group, a cyclopropyl group, a cyclobutyl group, a cyclopentyl group, a methylcyclopentyl group, a cyclohexyl group, a methylcyclohexyl group, a cycloheptyl group, a chyclooctyl group, a cyclododecyl group, a 1-adamantyl group, a 2-adamantyl group, an exo-norborneol group, an endo-norbornyl group, a 2-bicyclo [2.2.2]octyl group, a nopinyl group, a decahydronaphthyl group, a menthyl group, a neomenthyl group, a neopentyl group, a 5-decyl group, a phenyl group, a naphthyl group, an anthracenyl group, a fluorenyl group, a tolyl group, a xylyl group, a benzyl group, and a p-ethylphenyl group.

Among these, a more preferred substituent is a methyl group and a benzyl group, and still more preferred is a methyl group.

The hydrocarbon group having 1 to 30 carbon atoms substituted by a halogen atom represented by $R^5$ is preferably a substituent in which the hydrocarbon group having 1 to 30 carbon atoms is substituted by a fluorine atom, a chlorine atom or a bromine atom; and specific preferred examples include a trifluoromethyl group and a pentafluorophenyl group.

The hydrocarbon group having 1 to 30 carbon atoms substituted by an alkoxy group represented by $R^5$ is preferably a substituent in which the hydrocarbon group having 1 to 30 carbon atoms is substituted by a methoxy group, an ethoxy group, an isopropoxy group, a 1-propoxy group, a 1-butoxy group or a t-butoxy group. The substituent is more preferably a hydrocarbon group having 2 to 6 carbon atoms substituted by a methoxy group or an ethoxy group. Specific examples thereof include a 1-(methoxymethyl)ethyl group, a 1-(ethoxymethyl)ethyl group, a 1-(phenoxymethyl)ethyl group, a 1-(methoxyethyl)ethyl group, a di(ethoxymethyl) methyl group, and a di(phenoxymethyl)ethyl group. Particularly preferred is a 1-(methoxymethyl)ethyl group and a 1-(ethoxymethyl)ethyl group.

The alkoxy group represented by $R^5$ is preferably an alkoxy group having 1 to 6 carbon atoms, and specific examples include a methoxy group, an ethoxy group, an isopropoxy group, a 1-propoxy group, a 1-butoxy group and a t-butoxy group. Among these, a more preferred substituent is a methoxy group, an ethoxy group and an isopropoxy group, and a particularly preferred is a methoxy group.

The hydrocarbon group having 7 to 30 carbon atoms substituted by an aryloxy group having 6 to 20 carbon atoms and represented by $R^5$ is preferably a substituent in which the hydrocarbon group having 1 to 30 carbon atoms is substituted by a phenoxy group, a 4-methylphenoxy group, a 4-methoxyphenoxy group, a 2,6-dimethylphenoxy group, or a 2,6-di-t-butylphenoxy group. The substituent is more preferably a hydrocarbon group having 1 to 6 carbon atoms substituted by a phenoxy group or a 2,6-dimethylphenoxy group, and particularly preferably a 1-(phenoxymethyl)ethyl group or a 1-(2,6-dimethylphenoxymethyl) ethyl group.

The hydrocarbon group having 3 to 30 carbon atoms substituted by an amide group having 2 to 10 carbon atoms and represented by $R^5$ is preferably a substituent in which the hydrocarbon group having 1 to 30 carbon atoms is substituted by an acetamide group, a propionylamino group, a butyrylamino group, an isobutyrylamino group, a valerylamino group, an isovalerylamino group, a pivaloylamino group, or a benzoylamino group. The substituent is more preferably a 2-acetamidephenyl group, 2-propionylaminophenyl group, 2-valerylaminophenyl group, and 2-benzoylphenyl group, and particularly preferably a 2-acetamidephenyl group.

The aryloxy group having 6 to 30 carbon atoms and represented by $R^5$ is preferably an aryloxy group having 6 to 12 carbon atoms, and preferable specific examples include a phenoxy group, a 4-methylphenoxy group, a 4-methoxyphenoxy group, a 2,6-dimethylphenoxy group, or a 2,6-di-t-butylphenoxy group. Among these, the substituent is more preferably a phenoxy group or a 2,6-dimethylphenoxy group, and particularly preferably a phenoxy group.

The acyloxy group having 2 to 10 carbon atoms and represented by $R^5$ is preferably an acyloxy group having 2 to 8 carbon atoms, and preferable specific examples include an acetyloxy group, a propionyloxy group, a butyryloxy group, an isobutyryloxy group, a valeryloxy group, an isovaleryloxy group, a pivaloyloxy group, or a benzoyloxy group.

Among these, the substituent is more preferably an acetyloxy group, a propionyloxy group, and a benzoyloxy group, and particularly preferably an acetyloxy group and a propionyloxy group.

Among these preferable groups as $R^5$, more preferred are a hydrocarbon group having 1 to 20 carbon atoms, a hydrocarbon group having 2 to 30 carbon atoms which is substituted by an alkoxy group, and an alkoxy group having 1 to 20 carbon atoms; and particularly preferable specific examples include a methyl group, a benzyl group, a methoxy group, 2-acetamidephenyl group and an acetyloxy group.

$R^6$ and $R^7$ independently represent a hydrogen atom, alkoxy group, aryloxy group, silyl group, amino group or hydrocarbon group having 1 to 120 carbon atoms which may be substituted by one or more groups selected from a halogen atom, alkoxy group and aryloxy group. It is to be noted that at least one of $R^6$ and $R^7$ represents an alkyl group having 1 to 10 carbon atoms or a cycloaklyl group having 4 to 106 carbon atoms. $R^6$ or $R^7$ may bond to $Y^1$ to form a ring structure.

As the alkoxy group as being $R^6$ and $R^7$, preferred are those having 1 to 20 carbon atoms including methoxy group, ethoxy group, propoxy group and isopropoxy group. As the aryloxy group as being $R^6$ and $R^7$, preferred are those having 6 to 24 carbon atoms including phenoxy group. Examples of the silyl group as being $R^6$ and $R^7$ include trimethylsilyl group, and examples of the amino group include amino group, methylamino group and dimethylamino group. Specific examples of the hydrocarbon group having 1 to 120 carbon atoms which may be substituted by one or more groups selected from a halogen atom, alkoxy group and aryloxy group in $R^6$ and $R^7$ include methyl group, ethyl group, n-propyl group, isopropyl group, n-butyl group, isobutyl group, sec-butyl group, t-butyl group, n-pentyl group, 2-pentyl group, 3-pentyl group, neopentyl group, n-hexyl group, 2-hexyl group, 3-hexyl group, 2-heptyl group, 3-heptyl group, 4-heptyl group, 2-methyl-4-heptyl group, 2,6-dimethyl-4-heptyl group, 3-methyl-4-heptyl group, cyclopropyl group, cyclobutyl group, cyclopentyl group, cyclohexyl group, cycloheptyl group, cyclooctyl group, 1-adamantyl group, trifluoromethyl group, benzyl group, 2'-methoxybenzyl group, 3'-methoxybenzyl group, 4'-methoxybenzyl group, 4'-trifluoromethylbenzyl group, phenyl group, 2-methylphenyl group, 3-methylphenyl group, 4-methylphenyl group, 2,6-dimethylphenyl group, 3,5-dimethylphenyl group, 2,4,6-trimethylphenyl group, 2-isopropylphenyl group, 3-isopropylphenyl group, 4-isopropylphenyl group, 2,6-diisopropylphenyl group, 3,5-diisopropylphenyl group, 2,4,6-triisopropylphenyl group, 2-t-butylphenyl group, 2-cyclohexylphenyl group, 2-methoxyphenyl group, 3-methoxyphenyl group, 4-methoxyphenyl group, 2,6-dimethoxyphenyl group, 3,5-dimethoxyphenyl group, 2,4,6-trimethoxyphenyl group, 4-fluorophenyl group, pentafluorophenyl group, 4-trifluoromethylphenyl group, 3,5-bis(trifluoromethyl)phenyl group, 1-naphthyl group, 2-naphthyl group, 2-furyl group, 2-biphenyl group, 2',6'-dimethoxy-2-biphenyl group, 2'-methyl-2-biphenyl group, 2',4',6'-triisopropyl-2-biphenyl group.

$R^6$ and $R^7$ may be the same or different from each other. Also, $R^6$ and $R^7$ may bond to each other to form a ring structure. $R^6$ and/or $R^7$ may bond to $Y^1$ to form a ring structure.

At least one of $R^6$ and $R^7$ represents an alkyl group having 1 to 10 carbon atoms or a cycloalkyl group having 4 to 106 carbon atoms. As being an alkyl group having 1 to 10 carbon atoms, preferred are methyl group, ethyl group, n-propyl group, isopropyl group, n-butyl group, isobutyl group, sec-butyl group and t-butyl group. Examples of a cycloalkyl group having 4 to 106 carbon atoms include cyclobutyl group, cyclopentyl group, cyclohexyl group, cycloheptyl group and cyclooctyl group; and a cycloalkyl group represented by the following formula (5) is specifically preferable.

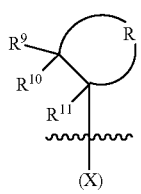

(5)

In the formula, R represents an alkylene group having 1 to 14 carbon atoms which may have a substituent. $R^9$, $R^{10}$ and $R^{11}$ independently represent a hydrogen atom, alkoxy group, aryloxy group, silyl group, amino group or a hydrocarbon group having 1 to 30 carbon atoms which may be substituted by one or more group selected from a halogen atom, alkoxy group or aryloxy group; and at least one of $R^9$ and $R^{10}$ is not a hydrogen atom. $R^9$, $R^{10}$, $R^{11}$ and the above-mentioned alkylene group R may bond to each other to form a ring structure. In the formula, the bond between the carbon atom and X in formula (C1) is also shown.

Furthermore, both of $R^6$ and $R^7$ are preferably a cycloalkyl group represented by formula (5) in view of ease of synthesis.

In formula (5), R represents an alkylene group having 1 to 14 carbon atoms which may have a substituent. $R^9$, $R^{10}$ and $R^{11}$ independently represent a hydrogen atom, alkoxy group, aryloxy group, silyl group, amino group or a hydrocarbon group having 1 to 30 carbon atoms which may be substituted by one or more group selected from a halogen atom, alkoxy group or aryloxy group; and at least one of $R^9$ and $R^{10}$ is not a hydrogen atom. It is presumed that the substituent $R^9$ or $R^{10}$, which is not a hydrogen atom, inhibits the chain transfer of the polymer due to β-hydrogen elimination during the polymerization reaction and thereby improves the molecular weight of the obtained polymer. Specific examples of the alkoxy group, aryloxy group, silyl group, amino group or a hydrocarbon group having 1 to 30 carbon atoms which may be substituted by one or more group selected a halogen atom, alkoxy group or aryloxy group represented by $R^9$, $R^{10}$ and $R^{11}$ include the same as those mentioned as $R^6$ and $R^7$. $R^9$, $R^{10}$ and $R^{11}$ may be the same or different from each other. $R^9$, $R^{10}$, $R^{11}$ and the above-mentioned alkylene group R may bond to each other to form a ring structure. The number of carbon atoms of alkylene group R is preferably 2 to 6, and more preferably 4.

At least one of $R^9$ and $R^{10}$ is preferably an alkyl group having 1 to 6 carbon atoms or a cycloalkyl group having 3 to 8 carbon atoms. Furthermore, it is preferable that at least one of $R^9$ and $R^{10}$ is an isopropyl group.

Specific examples of X—$R^6$ or X—$R^7$ moiety in the case where $R^6$ or $R^7$ is represented by formula (5) are given below. Here, Me represents a methyl group and the bond between X and M or that between X and $Y^1$ is not shown.

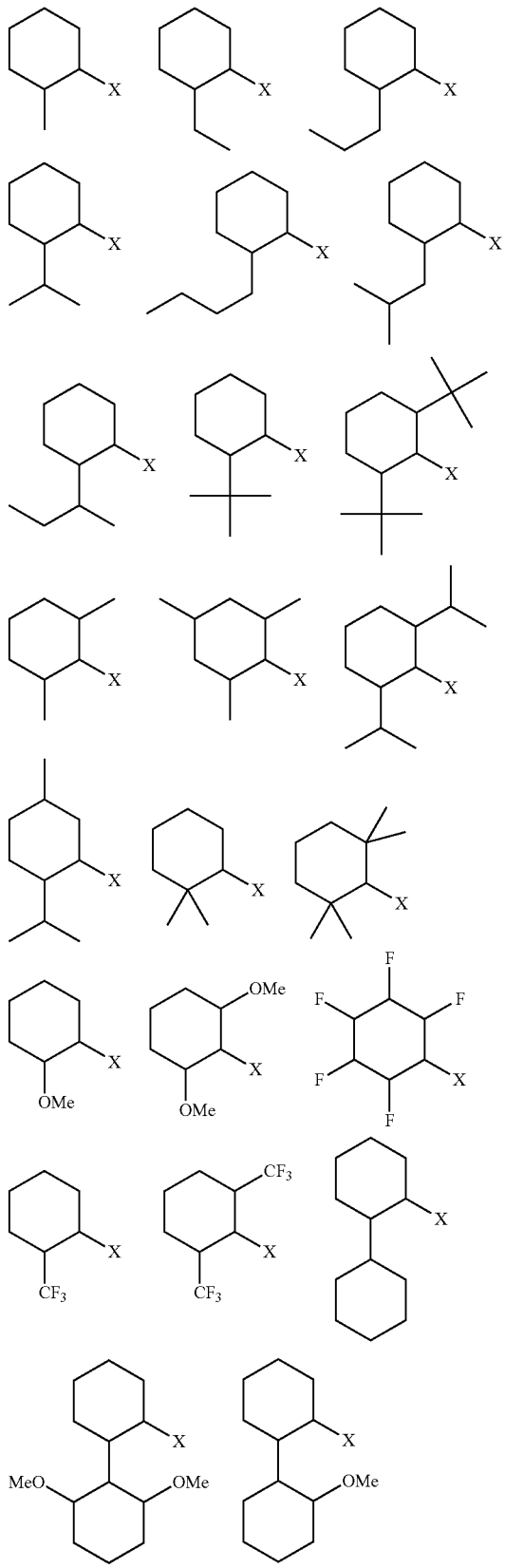

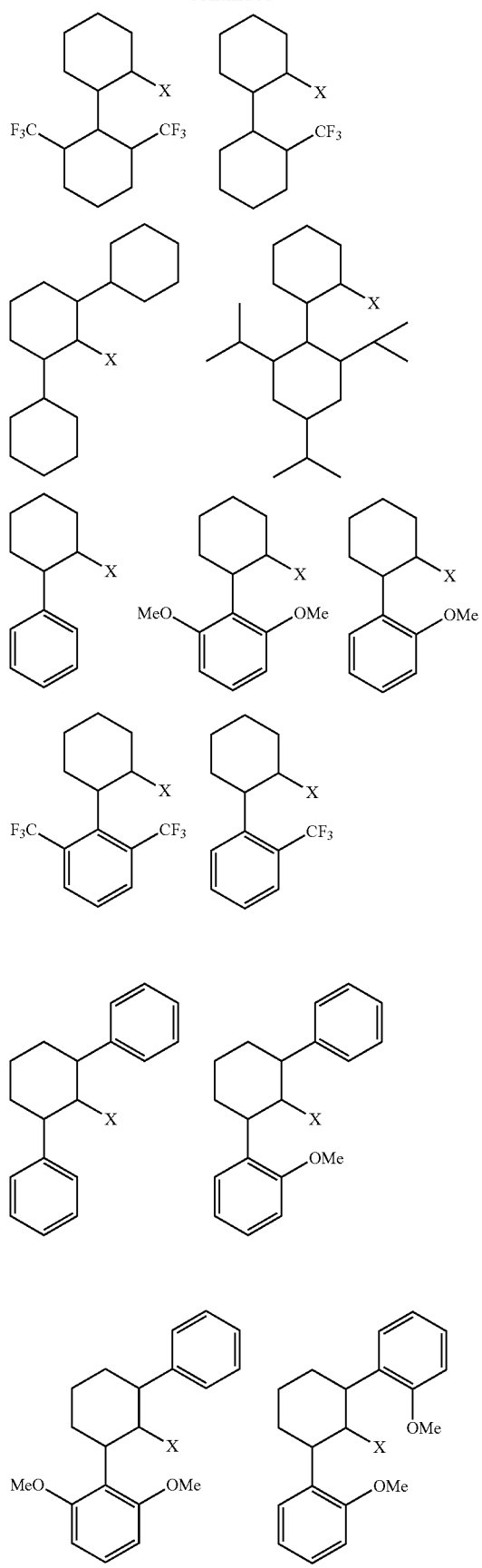
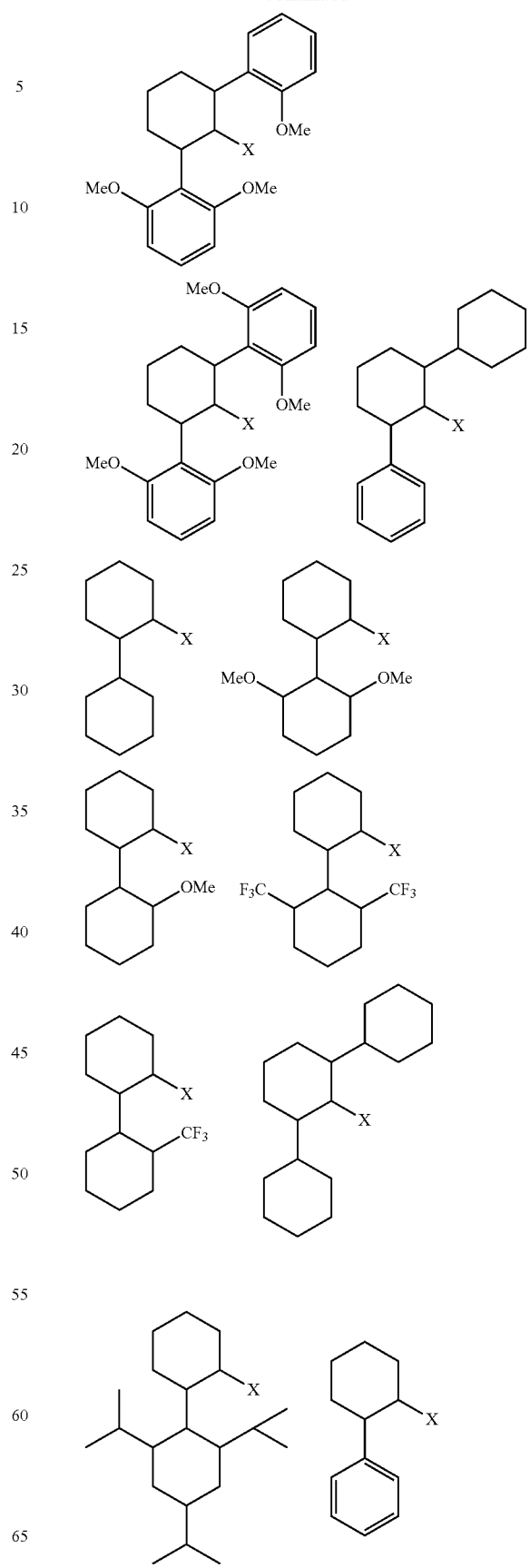

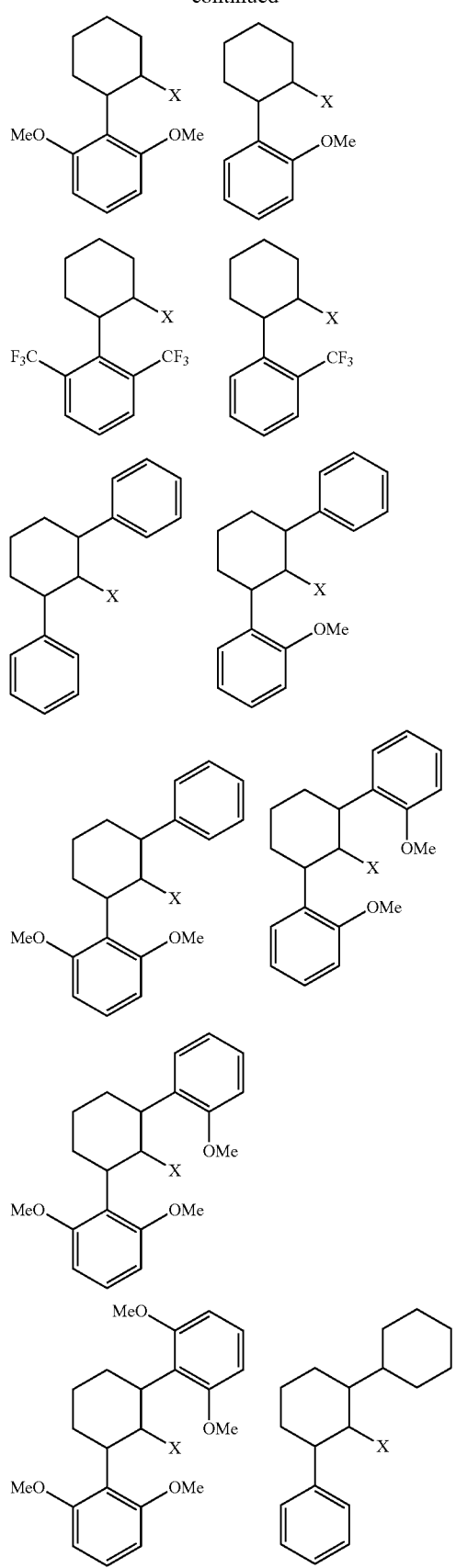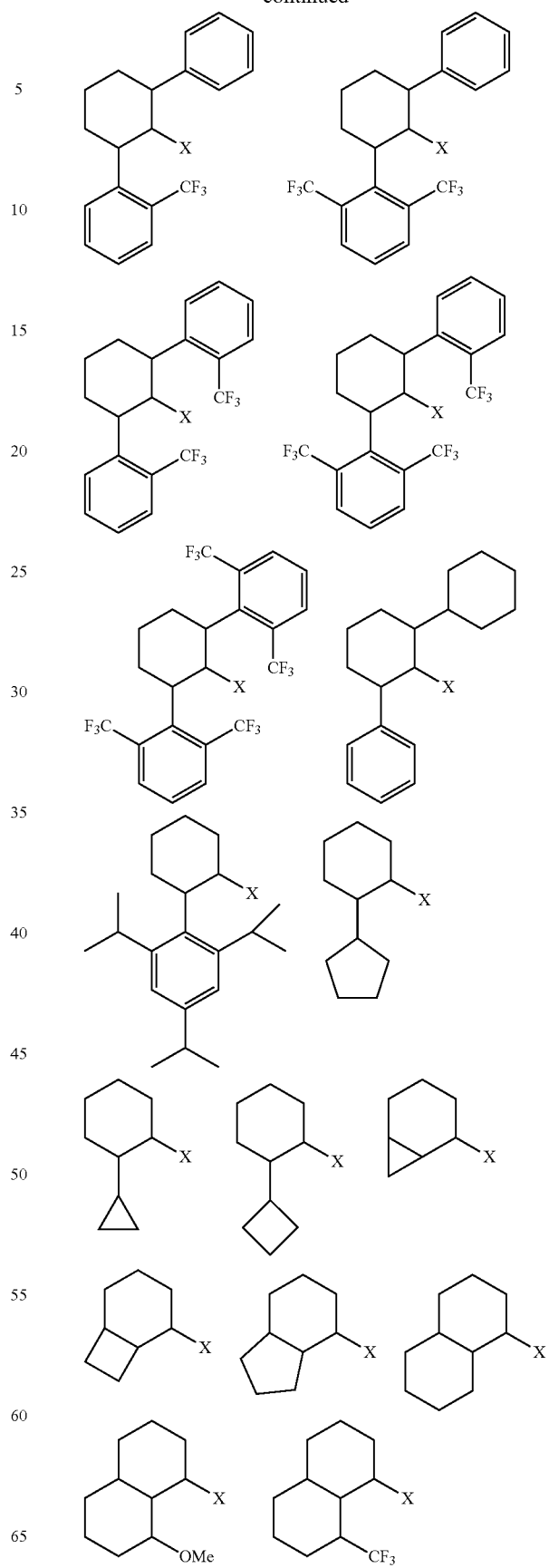

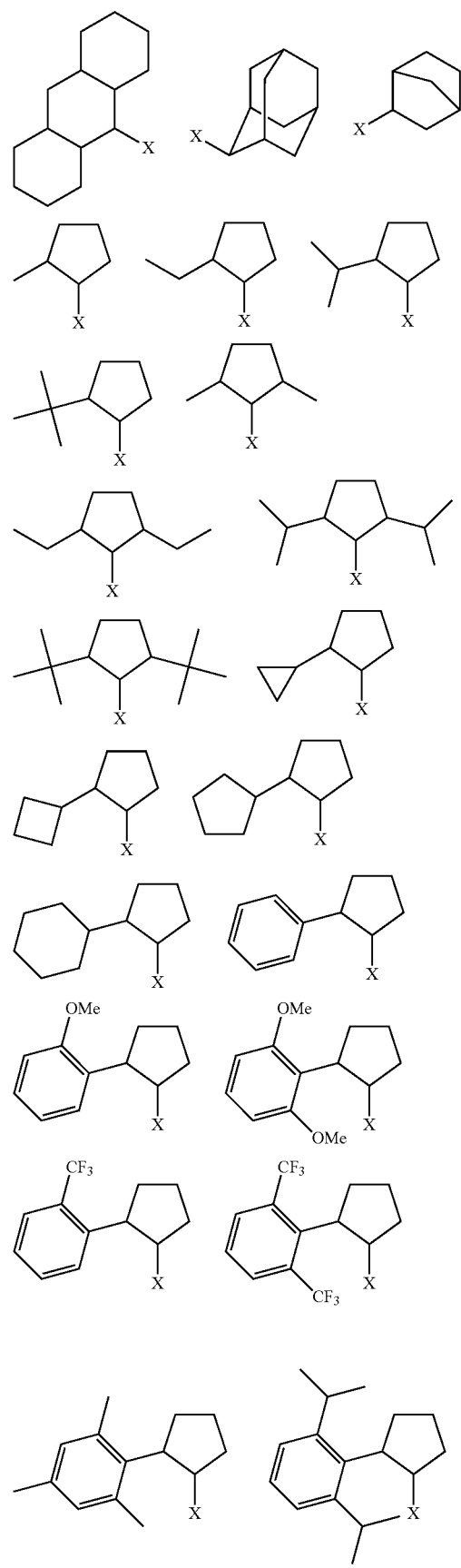
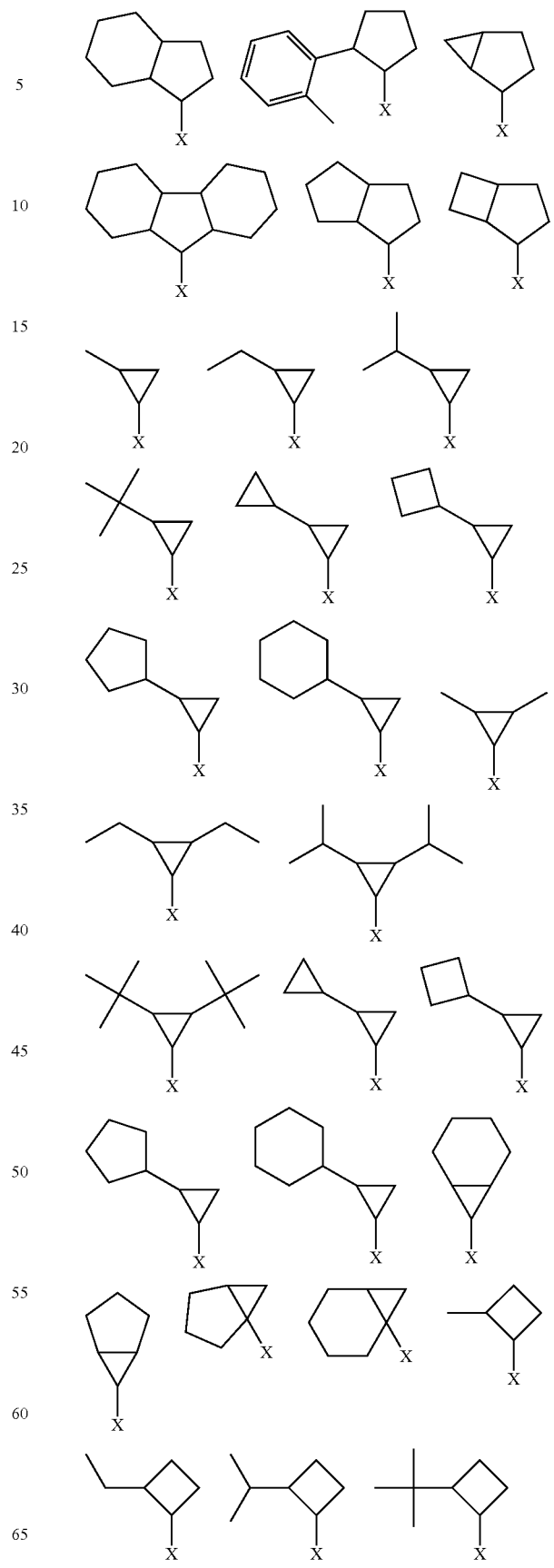

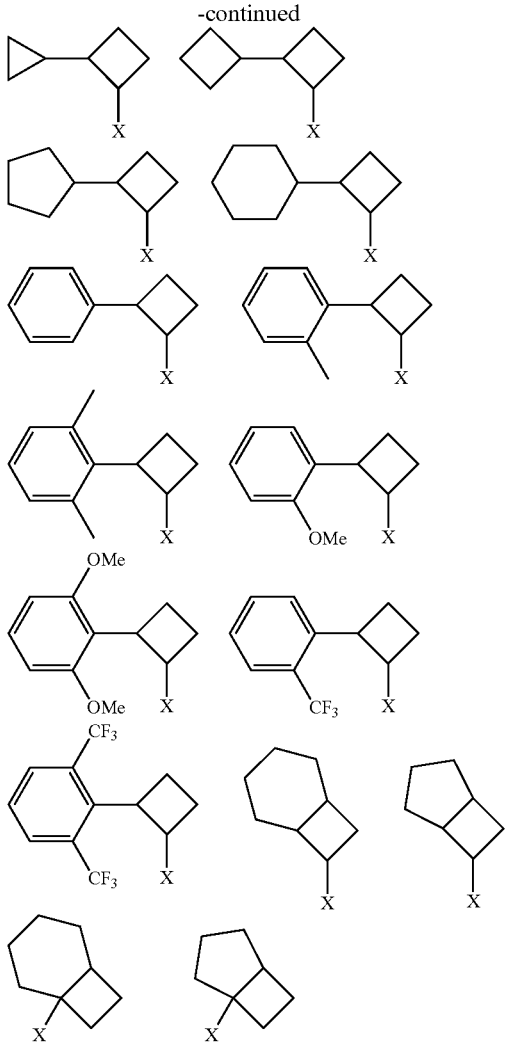

Among these, $R^6$ and $R^7$ are preferably a menthyl group represented by the following formula (2-isopropyl-5-methylcyclohexyl group).

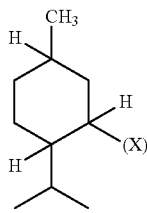

Furthermore, it is more preferable that both of $R^6$ and $R^7$ are a menthyl group.

In formula (C1), Q represents a bivalent group indicated by
—S(=O)₂—O—, —C(=O)—O—, —P(=O)(—OH)—O— or —S—, which is a moiety, wherein one electron coordinates to M. The left side of each of the above-mentioned formulae bonds to $Y^1$ while the right side bonds to M. Among these, —S(=O)₂—O— is particularly preferable from the viewpoint of the catalyst activity.

A single electron of an oxygen atom or a sulfur atom having high electronegativity of $Y^1$-Q moiety coordinates to metal atom M. Since the bonding electron between $Y^1$-Q-M is transferred from M to $Y^1$-Q, $Y^1$-Q and M may be indicated formally as an anion state and a cation state, respectively.

In formula (C1), $Y^1$ represents a bivalent hydrocarbon group having 1 to 70 carbon atoms which is substituted by at least one silyl group and may be substituted by one or more groups selected from a halogen atom, silyl group, alkoxy group and aryloxy group. Specific examples of the halogen atom, alkoxy group and aryloxy group as being a substituent in $Y^1$ are the same as those mentioned in $R^6$ and $R^7$. Examples of a silyl group as being a substituent in $Y^1$ include trimethylsilyl group, triethylsilyl group, tripropylsilyl group, tributylsilyl group, triisopropylsilyl group, t-butyldimethylsilyl group and t-butyldiphenylsilyl group; and particularly preferred are trimethylsilyl group and triethylsilyl group. Examples of the hydrocarbon group having 1 to 70 carbon atoms include alkylene group and arylene group. Particularly preferred is arylene group.

The cross-linked structure $Y^1$ is the crosslinking moiety which binds X and Q moiety. Specific examples of the cross-linked structure $Y^1$ in which X is represented by a P atom are shown below. Here, multiple $R^4$s may be the same or different to each other and represent a hydrogen atom, silyl group, halogen atom, hydrocarbon group having 1 to 20 carbon atoms, alkoxy group having 1 to 8 carbon atoms, aryloxy group having 6 to 20 carbon atoms, or a hydrocarbon group having 1 to 20 carbon atoms substituted by a silyl group or a halogen atom. It is to be noted that the upper limit of the carbon atoms of $Y^1$ is 70 and at least one of $R^4$s is a silyl group.

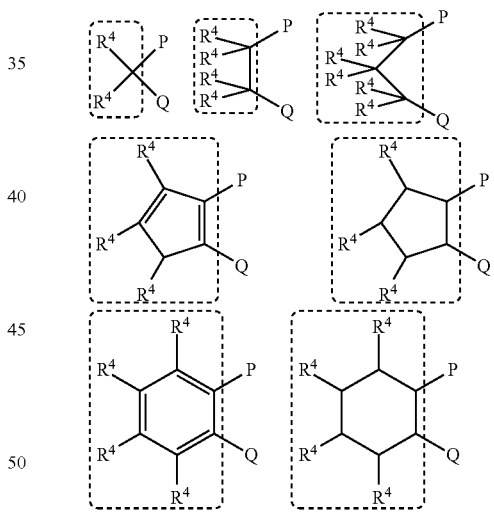

Specific examples of the halogen atom, alkoxy group, aryloxy group and silyl group represented by $R^4$ are the same as those mentioned in $Y^1$. Examples of the hydrocarbon group having 1 to 20 carbon atoms and the hydrocarbon group having 1 to 20 carbon atoms which is substituted by a halogen atom represented by $R^4$ include methyl group, ethyl group, n-propyl group, isopropyl group, n-butyl group, isobutyl group, sec-butyl group, t-butyl group, n-pentyl group, 2-pentyl group, 3-pentyl group, neopentyl group, n-hexyl group, 2-hexyl group, 3 hexyl group, cyclopropyl group, cyclobutyl group, cyclopentyl group, cyclohexyl group, cycloheptyl group, cyclooctyl group, cyclododecyl group, 1-adamantyl group, 2-adamantyl group, exo-norbornyl group, endo-norbornyl group, menthyl group, neomenthyl group, trifluoromethyl group, benzyl group, 4'-trifluoromethylbenzyl group, phenyl group, 2-methylphenyl group, 3-methylphenyl group, 4-methylphenyl group, 2,6-dimethylphenyl group, 3,5-dimethylphenyl group, 2,4,6-trimethylphenyl group, 2-isopropylphenyl group, 3-isopropylphenyl group, 4-isopropylphenyl group, 2,6-diisopropylphenyl group, 3,5-diisopropylphenyl group, 2,4,6-triisopropylphenyl group, 2-t-butylphenyl group, 2-cyclohexylphenyl group, 4-fluorophenyl group, pentafluorophenyl group, 4-trifluoromethylphenyl group, 3,5-bis(trifluoromethyl)phenyl group, 1-naphthyl group, 2-naphthyl group, 2-furyl group, 2-biphenyl group, 2'-methyl-2-biphenyl group, 2',4',6'-triisopropyl-2-biphenyl group, vinyl group, allyl group, butenyl group, cyclohexenyl group, cinnamyl group, styryl group, anthracenyl group and fluorenyl group.

Substituents $R^6$ and $R^7$ may bond to $Y^1$ moiety to form a ring structure. Specific examples include the structures as follows. The examples described below show the case where substituent $R^6$ bonds to $Y^1$ moiety to form a ring structure.

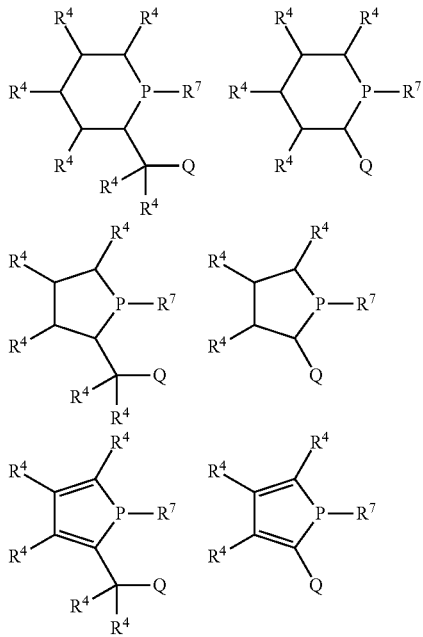

Among the metal complexes represented by formula (C1), those represented by the following formula (C2) are particularly preferable.

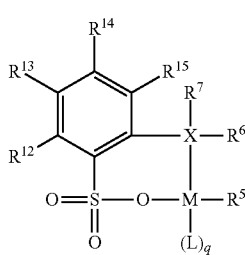

(C2)

In formula (C2), $R^{12}$ to $R^{15}$ represent a hydrogen atom, silyl group, halogen atom, a hydrocarbon group having 1 to 20 carbon atoms, an alkoxy group having 1 to 8 carbon atoms, an aryloxy group having 6 to 20 carbon atoms, and a hydrocarbon group having 1 to 20 carbon atoms substituted by a silyl group or a halogen atom. Specific examples thereof are the same as those described in $R^4$. At least one of $R^{12}$ to $R^{15}$ is a silyl group. M, X, $R^5$, $R^6$, $R^7$, L and q have the same meanings as described in formula (C1).

Among those represented by formula (C2), preferred are those represented by the following formula (C3), in which $R^{12}$ is a silyl group.

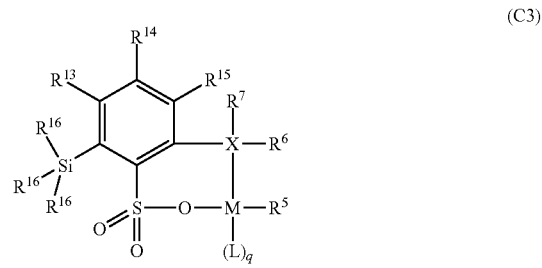

(C3)

In the formula, three independent $R^{16}$s may be the same or different to each other and represent a hydrogen atom or a hydrocarbon group having 1 to 8 carbon atoms. M, X, $R^5$, $R^6$, $R^7$, $R^{13}$, $R^{14}$, $R^{15}$, L and q have the same meanings as described in formula (C2).

In formula (C3), $R^{16}$ is preferably a hydrocarbon group having 1 to 4 carbon atoms, and particularly preferably, all the three $R^{16}$s are a methyl group. $R^{13}$ is preferably a hydrogen atom or a hydrocarbon group having 1 to 6 carbon atoms, and particularly preferably, a hydrogen atom, isopropyl group or phenyl group. $R^{14}$ and $R^{15}$ are preferably a hydrogen atom or a hydrocarbon group having 1 to 4 carbon atoms, and particularly preferably a hydrogen atom.

Among the catalysts represented by formula (C3), those represented by the following formula (C4) or (C5) are particularly preferable (in the formula, Men represents a menthyl group and Me represents a methyl group).

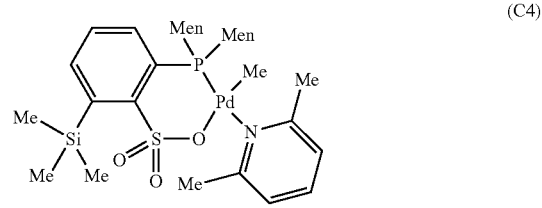

(C4)

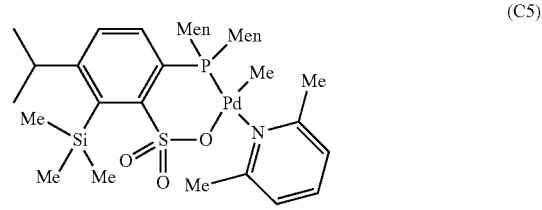

(C5)

The metal complex of the catalysts represented by formula (C1) can be synthesized according to the method similar to those described in known documents (for example, J. Am. Chem. Soc. 2007, 129, 8948). That is, a metal complex is synthesized by reacting zerovalent or bivalent M source with a ligand in formula (C1).

The compound represented by formulae (C2) and (C3) can be synthesized by making $Y^1$ and Q in formula (C1) a specific group corresponding to formulae (C2) and (C3).

Examples of zerovalent M source include tris(dibenzylideneacetone) dipalladium as a palladium source and tetracarbonyl nickel(0) (Ni(CO)$_4$) and bis(1,5-cyclooctadiene)nickel as a nickel source.

Examples of bivalent M source include (1,5-cyclooctadiene)(methyl)palladium chloride, palladium chloride, palladium acetate, bis(acetonitrile)dichloropalladium (PdCl$_2$(CH$_3$CN)$_2$), bis(benzonitrile)dichloropalladium (PdCl$_2$(PhCN)$_2$), (N,N,N',N'-tetramethylethylenediamine)dichloro palladium(II) (PdCl$_2$(TMEDA)), (N,N,N',N'-tetramethylethylenediamine)dimethyl palladium (II) (PdMe$_2$(TMEDA)), palladium(II) acetylacetonate (Pd(acac)$_2$), (acac means "acetylacetonato"), palladium(II) trifluoromethanesulfonate (Pd(OSO$_2$CF$_3$)$_2$) as a palladium source and (allyl)nickel chloride, (allyl)nickel bromide, nickel chloride, nickel acetate, nickel(II) acetylacetonate (Ni(acac)$_2$), (1,2-dimethoxyethane)dichloronickel(II) (NiCl$_2$(DME)) and nickel(II) trifluoromethanesulfonate (Ni(OSO$_2$CF$_3$)$_2$) as a nickel source.

While an isolated metal complex represented by formula (C1) can be used, the metal complex generated by bringing a M-containing metal source and a ligand precursor in the reaction system can also be used for in-situ polymerization without isolating the metal complex. Particularly, when $R^5$ in formulae (C1) is a hydrogen atom, it is preferable to use the metal complex generated in situ after reacting a metal source containing zerovalent M and a ligand precursor for polymerization without isolating the metal complex.

In this case, a ligand precursors in formula (C1) is represented by formulae (C1-1).

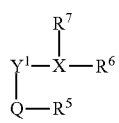

(C1-1)

(Symbols in the formula have the same meanings as mentioned above.)

In formula (C1), it is preferable to select the ratio between the M source (M) and a ligand precursor (C1-1) (C1 ligand) (i.e. (C1 ligand)/M) within the range of from 0.5 to 2.0, more preferably from 1.0 to 1.5.

When isolating the metal complex of formula (C1), the one stabilized by making an electron-donating ligand (L) coordinate to the metal complex in advance may be used. In this case, q is ½, 1 or 2. q of ½ means that a bivalent electron-donating ligand coordinates to two metal complexes. q is preferably ½ or 1 to stabilize a metal complex catalyst. q of 0 means that there is no ligand in the precursor.

An electron-donating ligand (L) is a compound which contains an electron-donating group and is capable of stabilizing a metal complex by coordinating to metal atom M.

As the electron-donating ligand (L), examples of those containing a sulfur atom include dimethyl sulfoxide (DMSO). Examples of those containing a nitrogen atom include trialkylamine having 1 to 10 carbon atoms in alkyl group, dialkylamine having 1 to 10 carbon atoms in alkyl group, pyridine, 2,6-dimethylpyridine (otherwise known as "2,6-lutidine"), aniline, 2,6-dimethylaniline, 2,6-diisopropylaniline, N,N,N',N'-tetramethylethylenediamine (TMEDA), 4-(N,N-dimethylamino)pyridine (DMAP), acetonitrile, benzonitrile, quinoline and 2-methylquinoline. Examples of those containing an oxygen atom include diethyl ether, tetrahydrofuran and 1,2-dimethoxyethane. From the viewpoint of stability and catalytic activity of the metal complex, L is preferably dimethyl sulfoxide (DMSO), pyridine, 2,6-dimethylpyridine (otherwise known as "2,6-lutidine") and N,N,N',N'-tetramethylethylenediamine (TMEDA), and more preferably, dimethyl sulfoxide (DMSO), pyridine and 2,6-dimethylpyridine (otherwise known as "2,6-lutidine").

The metal complex represented by formula (C1), (C2), (C3), (C4) or (C5) may be supported on a support to be used for polymerization. In this case, there are no particular limitations on the support and examples include an inorganic support such as silica gel and alumina and an organic support such as polystyrene, polyethylene and polypropylene. Examples of the method for depositing a metal complex on a support include a physical adsorption method of impregnating the support with a solution of the metal complex and drying it and a method of depositing the metal complex onto a support by chemically bonding the metal complex to a support.

[Monomer]

The method for producing polymers of the present invention enables not only the homopolymerization of ethylene but also the copolymerization of ethylene and a polar group-containing olefin. A polar group-containing olefin, which is a second monomer used in the method for producing polymers of the present invention, is represented by formula (1).

(1)

In the formula, $R^1$ represents a substituent group selected from a group consisting of a hydroxyl group, an alkoxy group having 1 to 10 carbon atoms, an aryloxy group having 6 to 20 carbon atoms, an acyl group having 2 to 10 carbon atoms, an ester group having 2 to 10 carbon atoms, an acyloxy group having 2 to 10 carbon atoms, an amino group, a substituted amino group having 1 to 12 carbon atoms, a substituted amide group having 2 to 12 carbon atoms, a substituted pyridyl group having 5 to 10 carbon atoms, a substituted pyrrolidyl group having 4 to 10 carbon atoms, a substituted piperidyl group having 5 to 10 carbon atoms, a substituted hydrofuryl group having 4 to 10 carbon atoms, a substituted imidazolyl group having 4 to 10 carbon atoms, a mercapto group, an alkylthio group having 1 to 10 carbon atoms, an arylthio group having 6 to 10 carbon atoms, an epoxy group, and a halogen atom. n is 0 and an arbitrary integer selected from 1 to 6.

The alkoxy group having 1 to 10 carbon atoms represented by $R^1$ is preferably an alkoxy group having 1 to 4 carbon atoms, and preferable specific examples include a methoxy group, an ethoxy group, an isopropoxy group, a 1-propoxy group, a 1-butoxy group and a t-butoxy group.

Among these, a more preferred substituent is a methoxy group, an ethoxy group and an isopropoxy group, and a particularly preferred is a methoxy group.

The aryloxy group having 6 to 20 carbon atoms and represented by $R^1$ is preferably an aryloxy group having 6 to 12 carbon atoms, and preferable specific examples include a phenoxy group, a 4-methylphenoxy group, a 4-methoxyphenoxy group, a 2,6-dimethylphenoxy group, 3,5-di-t-butylphenoxy group and a 2,6-di-t-butylphenoxy group.

Among these, the substituent is more preferably a phenoxy group, 3,5-di-t-butylphenoxy group or a 2,6-dimethylphenoxy group, and particularly preferably a phenoxy group or a 3,5-di-t-butylphenoxy group.

$R^1$ as being an acyl group having 2 to 10 carbon atoms is preferably an acyl group having 2 to 8 carbon atoms, and preferable specific examples include an acetyl group, a propionyl group, a butyryl group, an isobutyryl group, a valeryl group, an isovaleryl group, a pivaloyl group, and a benzoyl group.

Among these, the substituent is more preferably an acetyl group, a pivaloyl group and a benzoyl group, and particularly preferably a benzoyl group.

$R^1$ as being an ester group having 2 to 10 carbon atoms is preferably an ester group having 2 to 8 carbon atoms, and preferable specific examples include a methoxycarbonyl group, an ethoxycarbonyl group, an n-propoxycarbonyl group, an isopropoxycarbonyl group, an n-butoxycarbonyl group, a t-butoxycarbonyl group, a 4-hydroxybutoxycarbonyl group, a 4-glycidylbutoxycarbonyl group and a phenoxycarbonyl group.

Among these, the substituent is more preferably a methoxycarbonyl group, an ethoxycarbonyl group and a 4-hydroxybutoxycarbonyl group, particularly preferably a methoxycarbonyl group.

$R^1$ as being an acyloxy group having 2 to 10 carbon atoms is preferably an acyloxy group having 2 to 8 carbon atoms, and preferable specific examples include an acetyloxy group, a propionyloxy group, a butyryloxy group, an isobutyryloxy group, a valeryloxy group, an isovaleryloxy group, a pivaloyloxy group and a benzoyloxy group.

Among these, the substituent is more preferably an acetyloxy group, a propionyloxy group, and a benzoyloxy group, and particularly preferably an acetyloxy group and a propionyloxy group.

Preferable specific examples of $R^1$ as being a substituted amino group having 1 to 12 carbon atoms include a monomethylamino group, a dimethylamino group, a monoethylamino group, a diethylamino group, a monoisopropylamino group, a diisopropylamino group, a monophenylamino group, a diphenylamino group, a bis(trimethylsilyl)amino group and a morpholinyl group.

Among these, the substituent is more preferably a dimethyl amino group and a diphenylamino group.

Preferable specific examples of $R^1$ as being a substituted amide group having 1 to 12 carbon atoms include an acetamide group, a propionylamino group, a butyrylamino group, an isobutyrylamino group, a valerylamino group, an isovalerylamino group, a pivaloylamino group and a benzoylamino group.

Among these, the substituent is more preferably an acetamide group, a propionylamino group and a benzoylamino group, and particularly preferably an acetamide group.

Preferable specific examples of $R^1$ as being a substituted pyridyl group having 5 to 10 carbon atoms include a 2-pyridyl group, a 3-pyridyl group, a 2-(3-methyl)pyridyl group, a 2-(4-methyl)pyridyl group, a 3-(2-methyl)pyridyl group, a 3-(4-methyl)pyridyl group, a 2-(4-chloromethyl)pyridyl group and a 3-(4-chloromethyl)pyridyl group.

Among these, the substituent is more preferably a 2-pyridyl group, 3-pyridyl group and a 2-(4-methyl)pyridyl group, and particularly preferably a 2-pyridyl group.

Preferable specific examples of $R^1$ as being a substituted pyrrolidyl group having 4 to 10 carbon atoms include a 2-pyrrolidyl group, a 3-pyrrolidyl group, a 2-(1-methyl)pyrrolidyl group, a 2-(1-butyl)pyrrolidyl group, a 2-(1-cyclopentenyl)pyrrolidyl group, a 2-(4-methoxycarbonyl)pyrrolidyl group, a 2-(5-methoxycarbonyl)pyrrolidyl group and a 2-(6-methoxycarbonyl)pyrrolidyl group.

Among these, the substituent is more preferably a 2-pyrrolidyl group, a 3-pyrrolidyl group, a 2-(1-methyl)pyrrolidyl group and a 2-(6-methoxycarbonyl)pyrrolidyl group, and particularly preferably a 2-pyrrolidyl group.

Preferable specific examples of $R^1$ as being a substituted piperidyl group having 5 to 10 carbon atoms include a 2-piperidyl group, a 3-piperidyl group, a 2-(1,2,3,6-tetrahydro)piperidyl group, a 2-(1-methyl)piperidyl group, a 2-(1-ethyl)piperidyl group, a 2-(4-methyl)piperidyl group, a 2-(5-methyl)piperidyl group and 2-(6-methyl)piperidyl group.

Among these, the substituent is preferably a 2-piperidyl group, a 3-piperidyl group, a 2-(1,2,3,6-tetrahydro)piperidyl group and 2-(6-methyl)piperidyl group, and particularly preferably a 2-piperidyl group and a 2-(1,2,3,6-tetrahydro)piperidyl group.

Preferable specific examples of $R^1$ as being a substituted hydrofuryl group having 4 to 10 carbon atoms include a 2-tetrahydrofuryl group, a 3-tetrahydrofuryl group, a 2-(5-methyl)tetrahydrofuryl group, a 2-(5-isopropyl)tetrahydrofuryl group, a 2-(5-ethyl)tetrahydrofuryl group, a 2-(5-methoxy)tetrahydrofuryl group, a 2-(5-acetyl)tetrahydrofuryl group and a 2-(4,5-benzo)tetrahydrofuryl group.

Among these, the substituent is more preferably a 2-tetrahydrofuryl group, a 3-tetrahydrofuryl group, a 2-(5-methyl)tetrahydrofuryl group, a 2-(5-isopropyl)tetrahydrofuryl group and a 2-(4,5-benzo)tetrahydrofuryl group, and particularly preferably 2-tetrahydrofuryl group, a 2-(5-methyl)tetrahydrofuryl group and a 2-(5-isopropyl)tetrahydrofuryl group.

Preferable specific examples of $R^1$ as being a substituted imidazolyl group having 4 to 10 carbon atoms include a 2-imidazolyl group, a 2-(1-methyl)imidazolyl group, a 2-(1-benzyl)imidazolyl group, a 2-(1-acetyl)imidazolyl group, 2-(4,5-benzo)imidazolyl group and a 2-(1-methyl-4,5-beno)imidazolyl group.

Among these, the substituent is more preferably a 2-imidazolyl group, a 2-(1-methyl)imidazolyl group and 2-(4,5-benzo)imidazolyl group and particularly preferably a 2-(1-methyl)imidazolyl group and 2-(4,5-benzo)imidazolyl group.

Preferable specific examples of $R^1$ as being an alkylthio group having 1 to 10 carbon atoms include a methylthio group, an ethylthio group, a propylthio group and a t-butylthio group, and preferable specific examples of an arylthio group having 6 to 10 carbon atoms include a phenylthio group.

Among these, the substituent is more preferably a methylthio group, a t-butylthio group and a phenylthio group and particularly preferably a methylthio group and a phenylthio group.

Preferable specific examples of $R^1$ as being a halogen atom include a fluorine atom, a chlorine atom and a bromine atom. Among these, the substituent is more preferably a chlorine atom.

Among these preferable groups as being $R^1$, the substituent is more preferably an alkoxy group having 1 to 10 carbon atoms, an ester group having 2 to 10 carbon atoms and an acyloxy group having 2 to 10 carbon atoms; and particularly preferable examples of a polar comonomer represented by formula (1) include methyl acrylate, ethyl acrylate, allyl acetate and allylmethyl ether.

By performing saponification reaction or hydrolysis of a comonomer produced by use of ethylene and polar group-containing olefin represented by formula (1) in which $R^1$ is an acyloxy group as a monomer, a comonomer containing a hydroxyl group can be produced. For example, when the polar group-containing olefin represented by formula (1) is allyl acetate, by performing saponification reaction or hydrolysis reaction of a comonomer of allyl acetate and ethylene obtained by copolymerization of olefin and ethylene, polymer containing a hydroxyl group: i.e. copolymer of allyl alcohol and ethylene can be obtained. Also, by adjusting the degree of saponification, it is possible to produce a terpolymer of allyl alcohol, allyl acetate and ethylene.

When performing saponification reaction, an alcohol compound is allowed to react with a copolymer produced by use of ethylene and polar group-containing olefin represented by formula (1) in which $R^1$ is an acyloxy group as monomers under the basic condition. Examples of the base to be used include sodium hydroxide, potassium hydroxide and lithium hydroxide, and sodium hydroxide or potassium hydroxide is preferable from a cost viewpoint. There is no particular limit to the alcohol compound to be used, and low-boiling alcohol having 1 to 3 carbon atoms is preferable because it is necessary to separate the generated ester, a copolymer after the saponification reaction and a reaction solvent by distillation. Examples of alcohol having 1 to 3 carbon atoms include methanol, ethanol, n-propanol and isopropanol.

When performing hydrolysis reaction, a copolymer is allowed to react with water under the acidic condition or basic condition. Examples of the acid to be used include hydrochloric acid, sulfuric acid and nitric acid, and hydrochloric acid is preferable from a production cost viewpoint. Examples of the base to be used include sodium hydroxide, potassium hydroxide and lithium hydroxide, and sodium hydroxide or potassium hydroxide is preferable from a production cost viewpoint.

In either case of saponification reaction and hydrolysis reaction, a solvent may be or may not be used.

In the case of using a solvent, there is no particular limit to the solvent to be used and aliphatic hydrocarbon such as isobutane, pentane, hexane, heptane and cyclohexane; aromatic hydrocarbon such as benzene, toluene and xylene; halogenated aliphatic hydrocarbon such as chloroform, methylene chloride, carbon tetrachloride, dichloroethane and tetrachloroethane; and halogenated aromatic hydrocarbon such as chlorobenzene, dichlorobenzene and trichlorobenzene.

In the production method of the (co)polymer of the present invention, a third monomer may be used in addition to ethylene and polar group-containing olefin represented by formula (1). As a third monomer, α-olefin represented by formula (2) can be copolymerizaed.

$$CH_2=CHR^2 \qquad (2)$$

In formula (2), $R^2$ represents a hydrocarbon group having 1 to 20 carbon atoms. Specific examples of α-olefin represented by formula (2) include propylene, 1-butene, 1-pentene, 1-hexene, 4-methyl-1-pentene, 1-heptene, 1-octene, 1-nonene, 1-decene and styrene. Among these, preferred are propylene, 1-butene and 1-hexene. It is also possible to polymerize two or more of them in combination. It is to be noted that when propylene is copolymerized as a third monomer, the propylene ratio to the total of propylene and ethylene contained in the obtained polymer is less than 40 mol %.

In the case where α-olefin represented by formula (2) is to be copolymerized in addition to ethylene and polar group-containing olefin represented by formula (1), the molar ratio of the monomer units represented by formulae (3), (4) and (5) (l, m and p),

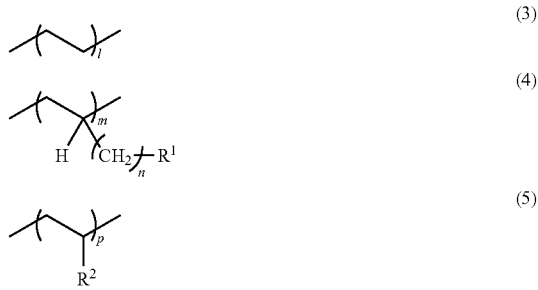

which monomer units correspond to the ethylene, monomer of formula (1) and monomer of formula (2) in the copolymer obtained by the production method of the present invention, preferably satisfies the relationship indicated by the following equation:

$$\{l/(l+p)\} \times 100 \geq 60.$$

In the case of a copolymer of ethylene and a monomer of formula (1) (p=0), the ratio of 1 to $100\times\{l/(l+m)\}$ is preferably 80 to 89, more preferably 90 to 99.

There is no particular limit to the content of the polar group-containing olefin by formula (1) (mol %=m/(l+m)×100) and the content is preferably 0.1% or more and 20% or less. More preferably, the content is 0.1% or more and 15% or less and particularly preferably 0.1% or more and 10% or less.

In the case of a copolymer of ethylene, a monomer of formula (1) and a monomer of formula (2), the ratio of 1 to $100\times\{l/(l+m+p)\}$ is preferably 80 to 89, more preferably 90 to 99.

There is no particular limit to the content of the polar group-containing olefin by formula (1) (mol %=m/(l+m+p)×100) and the content is preferably 0.1% or more and 20% or less. More preferably, the content is 0.1% or more and 15% or less and particularly preferably 0.1% or more and 10% or less.

[Polymerization Method]

When the metal complex of the present invention is used as a catalyst, there are no particular limitations on the method of polymerizing ethylene and monomers represented formulae (1) and (2) and the monomers can be polymerized by a widely-used method. That is, a process such as a solution polymerization method, a suspension polymerization method and a gas-phase polymerization method are available. Particularly preferred are a solution polymerization method and a suspension polymerization method. The polymerization style can be either of batch polymerization or continuous polymerization. Also, the polymerization can be conducted either by single-stage polymerization or multistage polymerization.

A mixture of two or more of the metal complex catalysts represented by formula (C1), (C2), (C3), (C4) or (C5) may be used for the polymerization reaction. Using the catalysts in mixture enables controlling the molecular weight and molecular weight distribution of the polymer and the content of the monomer unit derived from the monomer represented by formula (2) to thereby obtain a polymer suitable for the desired use. The molar ratio between the total amount of metal complex catalysts and the total amount of monomers (monomers/metal complex) is within the range of from 1 to 10,000,000, preferably the range of from 10 to 1,000,000, more preferably the range of from 100 to 100,000.

There are no particular limitations on the polymerization temperature. The polymerization is generally conducted at a temperature in the range of from −30 to 400° C., preferably in the range of from 0 to 180° C., more preferably in the range of from 20 to 150° C.

The polymerization is conducted at a polymerization pressure, wherein the internal pressure consists mostly of the pressure of ethylene represented by formula (1), in the range of from normal pressure to 100 MPa, preferably in the range of from normal pressure to 20 MPa and more preferably in the range of from normal pressure to 10 MPa.

The polymerization time can be appropriately adjusted depending on the processing mode and the polymerization activity of the catalyst, and can be as short as several minutes or as long as several thousand hours.

It is preferable to fill the atmosphere in the polymerization system with an inert gas such as nitrogen and argon to prevent components other than monomers such as air, oxygen and moisture being mixed into the atmosphere to retain the catalyst activity. In the case of the solution polymerization, an inert solvent may be used in addition to monomers. There are no particular limitations on the inert solvent, and examples include aliphatic hydrocarbon such as isobutane, pentane, hexane, heptane and cyclohexane; aromatic hydrocarbon such as benzene, toluene and xylene; halogenated aliphatic hydrocarbon such as chloroform, methylene chloride, carbon tetrachloride, dichloroethane and tetrachloroethane; halogenated aromatic hydrocarbon such as chlorobenzene, dichlorobenzene and trichlorobenzene; aliphatic ester such as methyl acetate and ethyl acetate; and aromatic ester such as methyl benzoate and ethyl benzoate.

EXAMPLES

Hereinafter, the present invention is described in greater detail by referring to Examples and Comparative Examples. The present invention is by no means limited thereto.

[Method for Analyzing the Polymer Structure]

The number average molecular weight and the weight average molecular weight of the (co)polymer obtained in Examples were determined by the following Method A or Method B.

(Method A)

The molecular weight was determined by size exclusion chromatography in which polystyrene is employed as an internal standard substance using a high-temperature GPC apparatus, HLC-8121GPC/HT, manufactured by Tosoh Corporation, provided with AT-806MS columns (two columns arranged in series) manufactured by SHOWA DENKO K.K. (solvent: 1,2-dichlorobenzene, temperature: 145° C.).

(Method B)

The molecular weight was determined by size exclusion chromatography in which polystyrene is employed as an internal standard substance using a high-temperature GPC apparatus, 150 C, manufactured by Waters Corporation, provided with AD806M/S columns (three columns arranged in series) manufactured by SHOWA DENKO K.K. and an RI detector, MIRAN1A, manufactured by FOXBORO Company (measurement wavelength: 3.42 am) (solvent: 1,2-dichlorobenzene, temperature: 145° C.). Thereafter, the molecular weight was converted to the molecular weight of standard polyethylene using the viscosity equation ($[\eta]=K \times M^{\alpha}$). As the coefficients K and a set used in the calculation, the following values were employed.

$PS: K=1.38 \times 10^{-4}, \alpha=0.7$ $PE: K=3.92 \times 10^{-4}, \alpha=0.733$ The content of the monomer unit derived from the polar group-containing olefin represented by formula (1) was determined by the following Method C or Method D.

(Method C)

The value was determined by $^1$H-NMR using JNM-ECS400 manufactured by JEOL Ltd. with 1,1,2,2-tetrachloroethane-d2 as a solvent.

(Method D)

A pressing plate having a thickness of about 0.5 mm was manufactured and infrared absorption spectroscopy was performed using FTIR-8300 type manufactured by Shimadzu Corporation. The comonomer content was calculated based on overtone absorption of the carbonyl group in the vicinity of 3,450 cm$^{-1}$ and infrared absorbance ratio of olefin in the vicinity of 4,250 cm$^{-1}$. In the calculation, a calibration curve made from $^{13}$C-NMR measurement was used.

The melting point of the (co)monomer was measured using DSC620 differential scanning calorimeter manufactured by Seiko Instruments Inc. A sample piece made into a sheet form was filled in a 5 mg aluminum pan, and heated to 200° C. at a temperature increase rate of 100° C./minute, retained at the temperature for 5 minutes, cooled to 20° C. at a temperature decrease rate of 10° C./minute to be crystallized, and then heated to 200° C. at a temperature increase rate of 10° C./minute to obtain a melting curve. The top temperature in the major endothermic peak in the last temperature rising step to obtain the melting curve was defined as a melting point.

[Synthesis of Metal Complex 1]

Metal complex 1 was synthesized according to the following reaction scheme:

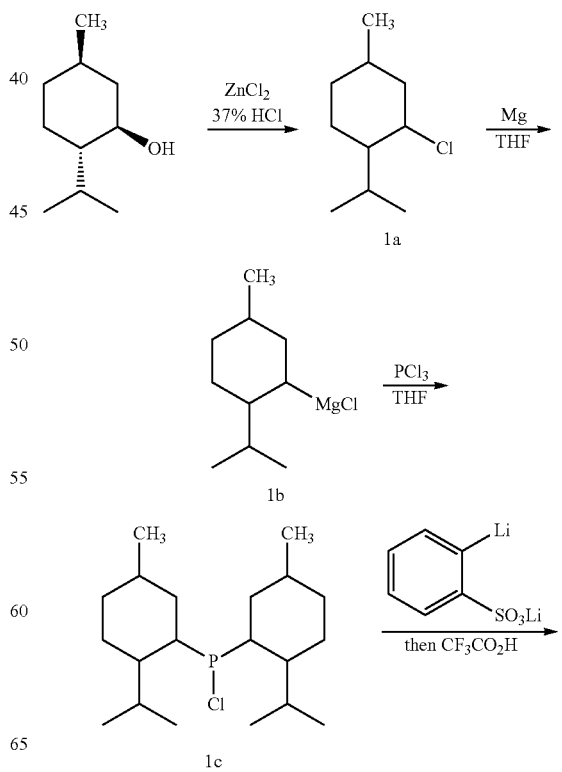

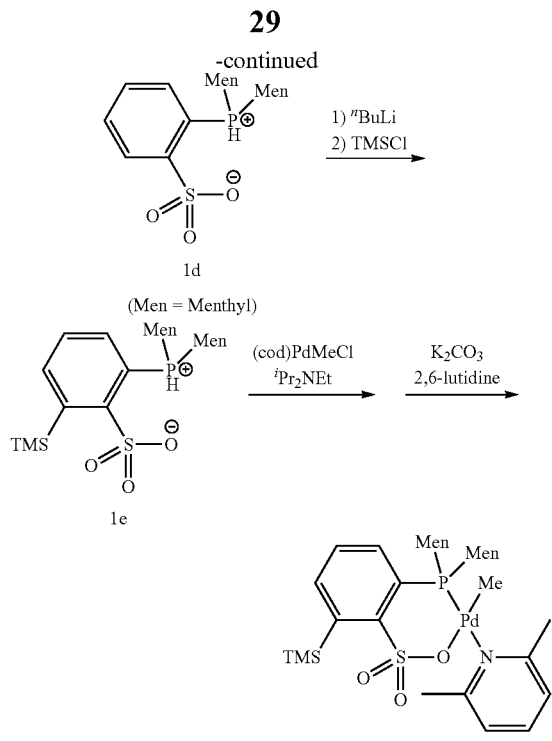

(a) Synthesis of Menthyl Chloride (Compound 1a)

Menthyl chloride (Compound 1a) was synthesized according to the method described in a literature (J. Org. Chem., 17, 1116. (1952)). That is, (−)-menthol (27 g, 0.17 mol) was added to the 37% hydrochloric acid solution (52 ml, 0.63 mol) of zinc chloride (77 g, 0.56 mol); the mixture was heated to 35° C. and stirred for five hours. After the reaction solution was cooled to room temperature, hexane (50 ml) was added thereto and an organic layer and an aqueous layer were separated using a separating funnel. After washing the organic layer with water (30 ml, one time), the layer was further washed with a concentrated sulfuric acid (10 ml, five times) and water (30 ml, five times). After drying the organic layer over magnesium sulfate, the layer was condensed under reduced pressure to obtain menthyl chloride (Complex 1a) as a colorless oily substance. The yield was 27 g (yield: 91%).

(b) Synthesis of Chlorodimenthylphosphine (Compound 1c)

Chlorodimenthylphosphine was synthesized according to the method described in a literature (Journal fur Praktische Chemie, 322, 485. (1980)). That is, a solution of menthylmagnesium chloride (Compound 1b) obtained by reacting menthyl chloride (Compound 1a; 2.6 g, 15 mmol) with magnesium (0.63 g, 26 mmol) in tetrahydrofuran (THF) (30 ml) on heating at 70° C. was added to a THF solution of phosphorous trichloride (0.63 ml, 7.2 mmol) at −78° C. After warming the solution to room temperature, the solution was heated to 70° C. and stirred for two hours. After the solvent was distilled away under reduced pressure, the residue was purified by distillation to obtain chlorodimenthylphosphine (Compound 1c). The yield was 0.62 g (yield: 25%).
$^{31}$P-NMR (162 MHz, THF): δ 123.9

(c) Synthesis of 2-(dimenthylphosphino)benzenesulfonic acid (Compound 1d)

n-Butyllithium (2.5 M hexane solution, 66.8 ml, 167 mmol) was added to a tetrahydrofuran solution (150 ml) of benzenesulfonic acid (13.2 g, 83.5 mmol) at 0° C. and the mixture was stirred for one hour at 10° C. After cooling the reaction container to −78° C., chlorodimenthylphosphine (Compound 1c; 11.5 g, 33.4 mmol) was added thereto at −78° C. and stirred at room temperature for 16 hours. After terminating the reaction by the addition of a tetrahydrofuran solution (50 ml) of trifluoroacetic acid (9.52 ml, 83.5 mmol) at 0° C., the solvent was distilled away under reduced pressure. After extracting the residue by dichloromethane (100 ml×4 times), the organic layer was dried over sodium sulfate. After distilling away the solvent, the residue was purified by silica gel column chromatography (dichloromethane/ethanol=10/1) and washed with ethyl acetate to obtain 2-(dimenthylphosphino)benzenesulfonic acid (Compound 1d) as a white powder. The yield was 5.0 g (yield: 32%).

(d) Synthesis of 2-(dimenthylphosphino)-6-(trimethylsilyl)benzenesulfonic acid (Compound 1e)

n-Butyllithium (2.5 M hexane solution, 12.9 ml, 32.2 mmol) was added to a THF solution (40 ml) of 2-(dimenthylphosphino)benzenesulfonic acid (Compound 1d; 2.50 g, 5.4 mmol) at −78° C. and the mixture was stirred for one hour at 10° C. After cooling the reaction container to −78° C., trimethylsilyl chloride (4.05 ml, 32.2 mmol) was added thereto at −78° C. and stirred at 10° C. for 16 hours. After terminating the reaction by pouring the reaction solution into ice water (50 ml), the residue was extracted with ethyl acetate (100 ml×3 times). After drying the organic layer over sodium sulfate, the solvent was distilled away under reduced pressure and the residue was washed with ethyl acetate (15 ml) to obtain 2-(dimenthylphosphino)-6-(trimethylsilyl)benzenesulfonic acid (Compound 1e) as a white powder. The yield was 2.10 g (yield: 73%).
$^1$H-NMR (400 MHz, CDCl$_3$): δ7.99 (d, J=7.2 Hz, 1H), 7.57 (dd, J=7.2, 16.0 Hz, 1H), 7.47 (m, 1H), 5.30 (d, J=339.2 Hz, 1H), 3.57 (dd, J=12.4, 27.6 Hz, 1H), 2.71 (br s, 2H), 2.03 (br s, 1H), 1.74 (br s, 6H), 1.60 (br s, 1H), 1.41 (br s, 2H), 1.28 (m, 1H), 1.09 (m, 6H), 0.94-0.67 (m, 15H), 0.46 (s, 9H), 0.22 (d, J=6.4 Hz, 3H)

(e) Synthesis of Metal Complex Catalyst 1

(cod)PdMeCl (cod=1,5-cyclooctadiene, 1.00 g, 3.77 mmol) was added to a methylene chloride solution (30 ml) of 2-(dimenthylphosphino)-6-(trimethylsilyl)benzenesulfonic acid (Compound 1e; 2.04 g, 3.79 mmol) and N,N-diisopropylethylamine (3.20 ml, 18.4 mmol) under argon atmosphere and the solution was stirred for one hour at room temperature. After condensing the solution, the residue was diluted with methylene chloride (10 ml), and the resultant solution was added to a methylene chloride suspension (20 ml) of potassium carbonate (5.20 g, 37.6 mmol) and 2,6-lutidine (4.40 ml, 37.8 mmol) and the resultant was stirred for one hour at room temperature. After filtering the reaction solution through a pad of Celite (dry diatom earth) and Florisil (magnesium silicate), the solvent was condensed and dried under reduced pressure. The residue was washed with hexane (5 ml×3 times) to obtain metal complex catalyst 1. The yield was 2.32 g (yield: 80%).

$^1$H-NMR (400 MHz, CDCl$_3$): δ 7.80 (d, J=7.5 Hz, 1H), 7.77 (t, J=8.0 Hz, 1H), 7.54 (t, J=7.7 Hz, 1H), 7.36 (dd, J=7.7, 7.6 Hz, 1H), 7.10 (d, J=7.7 Hz, 1H), 7.05 (d, J=7.6 Hz, 1H), 3.70 (m, 1H), 3.24 (s, 3H), 3.16 (s, 3H), 2.5-0.7 (m, 19H), 0.96 (d, J=6.4 Hz, 3H), 0.95 (d, J=6.4 Hz, 3H), 0.83 (d, J=6.6 Hz, 3H), 0.76 (d, J=6.7 Hz, 3H), 0.50 (d, J=6.6 Hz, 3H), 0.37 (s, 9H), 0.36 (m, 3H), 0.15 (d, J=6.7 Hz, 3H)

[Synthesis of Metal Complex 2]

Metal complex 2 was synthesized according to the following reaction scheme:

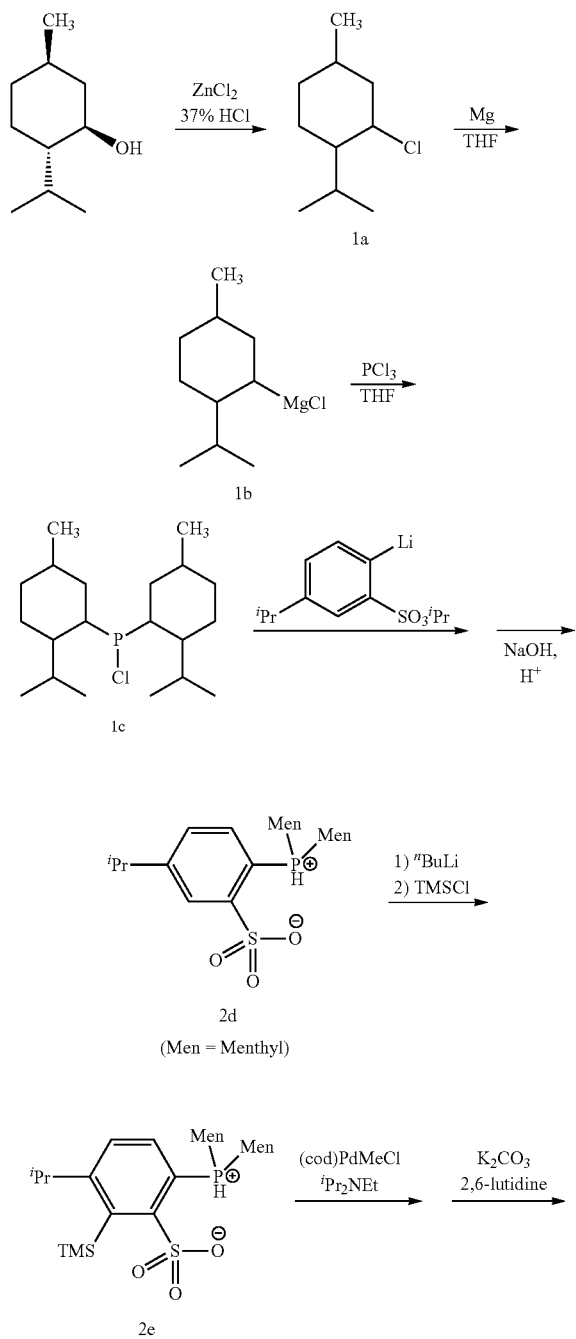

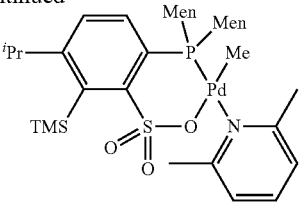

(f) Synthesis of 2-(dimenthylphosphino)-5-isopropyl-benzenesulfonic acid (Compound 2d)

n-Butyllithium (2.5 M hexane solution, 24.8 ml, 62.0 mmol) was added to a tetrahydrofuran solution (120 ml) of 5-isopropylbenzenesulfonic acid isopropyl ester (15.0 g, 62.0 mmol) at −78° C. and the mixture was stirred for one hour at −78° C. A tetrahydrofuran solution (60 ml) of chlorodimenthylphosphine (Compound 1c; 9.5 g, 27.5 mmol) was added thereto at −78° C. and the mixture was stirred at room temperature for 16 hours. After terminating the reaction by adding ice water (100 ml) to the reaction solution, the residue was extracted with ethyl acetate (100 ml×3 times) and the organic layer was dried over sodium sulfate. After filtration, the solvent was distilled away and the resultant in situ was used in the subsequent reaction.

Methanol (100 ml), sodium hydroxide (8.7 g, 218 mmol) and water (40 ml) were added to a tetrahydrofuran solution (80 ml) of 2-(dimenthylphosphino)-5-isopropylbenzenesulfonic acid isopropyl ester (36.3 mmol) and stirred for 16 hours at 80° C. After cooling the solution to room temperature, the solvent was distilled away under reduced pressure, and methylene chloride (200 ml) and water (200 ml) were added thereto. After further adding trifluoroacetate to adjust the pH to 4 to 5, the residue was extracted with dichloromethane (100 ml×2 times) and the organic layer was dried over sodium sulfate. After the solvent was distilled away, the residue was purified by silica gel column chromatography (dichloromethane/methanol=30/1) to obtain 2-dimenthylphosphino-5-isopropylbenzenesulfonic acid (Compound 2d) as a white powder. The yield was 6.0 g (yield: 42%).

(g) Synthesis of 2-dimenthylphosphino-5-isopropyl-6-trimethylsilylbenzenesulfonic acid (Compound 2e)

n-Butyllithium (2.5 M hexane solution, 9.5 ml, 23.6 mmol) was added to a THF solution (40 ml) of 2-dimenthylphosphino-5-isopropylbenzenesulfonic acid (Compound 2d; 2.0 g, 3.94 mmol) at −40° C. and the mixture was stirred at 10° C. for six hours. After cooling the reaction container to −78° C., trimethylsilyl chloride (3.0 ml, 23.6 mmol) was added at −78° C. and the mixture was stirred at room temperature for one hour. After terminating the reaction by pouring the reaction solution into ice water (50 ml), the residue was extracted with ethyl acetate (50 ml×3 times). After the organic layer was dried over sodium sulfate, the solvent was distilled away under reduced pressure and the residue was purified by silica gel column chromatography (dichloromethane/methanol=50/1) to obtain 2-dimenthylphosphino-5-isopropyl-6-trimethylsilylbenzenesulfonic acid (Compound 2e) as a white powder. The yield was 0.88 g (yield: 38%).

$^1$H-NMR (400 MHz, CDCl3): δ 7.5-7.4 (m, 2H), 5.22 (d, J=329.2 Hz, 1H), 3.56 (m, 2H), 2.67 (br, 2H), 1.95 (br, 1H), 1.8-1.6 (br, 7H), 1.4-1.3 (br, 9H), 1.2-1.1 (br, 9H), 1.0-0.8 (br, 12H), 0.73 (br, 3H), 0.55 (s, 9H)

(h) Synthesis of Metal Complex Catalyst 2

(Cod)PdMeCl (cod=1,5-cyclooctadiene, 0.47 g, 1.84 mmol) was added to a methylene chloride solution (10 ml) of 2-dimenthylphosphino-5-isopropyl-6-trimethylsilylbenzenesulfonic acid (Compound 2e; 1.10 g, 1.89 mmol) and N,N-diisopropylethylamine (1.60 ml, 9.19 mmol) under argon atmosphere and the solution was stirred for one hour at room temperature. After condensing the solution, the residue was diluted with methylene chloride (10 ml), and the resultant solution was added to a methylene chloride suspension (10 ml) of potassium carbonate (2.70 g, 19.5 mmol) and 2,6-lutidine (2.3 ml, 19.7 mmol) and the resultant was stirred for one hour at room temperature. After filtering the reaction solution through a pad of Celite (dry diatom earth) and Florisil (magnesium silicate), the solvent was condensed and the residue was dried under reduced pressure. The residue was dissolved in hexane (10 ml) and purified by silica gel column chromatography (hexane) to obtain metal complex catalyst 2. The yield was 0.58 g (yield: 39%).

$^1$H-NMR (400 MHz, CDCl$_3$): δ7.63 (t, J=8.2 Hz, 1H), 7.53 (t, J=7.7 Hz, 1H), 7.29 (d, J=8.2 Hz, 1H), 7.10 (d, J=7.8 Hz, 1H), 7.04 (d, J=7.3 Hz, 1H), 3.88 (m, 2H), 3.48 (m, 1H), 3.24 (s, 3H), 3.14 (s, 3H), 2.6-1.4 (brm, 18H), 1.38 (d, J=6.6 Hz, 3H), 1.04 (d, J=6.7 Hz, 3H), 0.96 (d, J=6.3 Hz, 3H), 0.94 (d, J=6.2 Hz, 3H), 0.84 (d, J=6.7 Hz, 3H), 0.74 (d, J=6.6 Hz, 6H), 0.46 (s, 9H), 0.34 (d, J=1.1 Hz, 3H), 0.23 (d, J=6.6 Hz, 3H)

[Synthesis of Comparative Metal Complexes 1 to 3]
(i) Synthesis of Comparative Metal Complex 1
Comparative Metal Complex 1 Represented by the Below Formula was Synthesized from the Above-Described 2-dimenthylphosphinobenzenesulfonic Acid (Compound 1d).

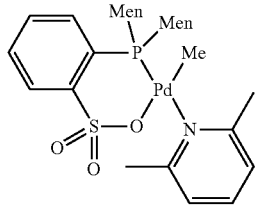

Comparative metal complex 1

(cod)PdMeCl (0.079 g, 0.30 mmol) was added to a methylene chloride solution (10 ml) of 2-dimenthylphosphinobenzenesulfonic acid (0.14 g, 0.30 mmol) and N,N-diisopropylethylamine (0.26 ml, 1.5 mmol) under argon atmosphere and the solution was stirred for one hour at room temperature. After condensing the solution, the residue was diluted with methylene chloride (10 ml), and the resultant solution was added to a methylene chloride suspension (2 ml) of potassium carbonate (0.42 g, 3.0 mmol) and 2,6-lutidine (0.35 ml, 3.0 mmol) and the resultant was stirred for one hour at room temperature. After filtering the reaction solution through a pad of Celite (dry diatom earth) and Florisil (magnesium silicate), the solvent was condensed and dried under reduced pressure to obtain comparative metal complex 1. The yield was 0.17 g (yield: 80%).

$^1$H-NMR (400 MHz, CDCl$_3$): δ 8.26 (ddd, J=7.8, 3.9, 1.4 Hz, 1H), 7.81 (t, J=7.9 Hz, 1H), 7.56 (t, J=7.7 Hz, 1H), 7.49 (t, J=7.6 Hz, 1H), 7.43 (t, J=7.4 Hz, 1H), 7.13 (d, J=7.8 Hz, 1H), 7.08 (d, J=7.6 Hz, 1H), 3.75 (s, 1H), 3.24 (s, 3H), 3.17 (s, 3H), 2.59 (s, 1H), 2.49-2.39 (m, 2H), 2.29-2.27 (m, 1H), 2.05-1.96 (m, 1H), 1.89-1.37 (m, 12H), 1.21-1.11 (m, 2H), 0.98 (d, J=6.6 Hz, 3H), 0.95 (d, J=6.2 Hz, 3H), 0.84 (d, J=6.6 Hz, 3H), 0.78 (d, J=6.6 Hz, 3H), 0.58 (d, J=6.6 Hz, 3H), 0.41 (d, J=2.3 Hz, 3H), 0.08 (d, J=6.6 Hz, 3H);
$^{31}$P-NMR (162 MHz, CDCl$_3$): δ 16.6.

(j) Synthesis of Comparative Metal Complexes 2 and 3

Comparative metal complexes 2 and 3 represented by the following formulae were synthesized according to Patent Document 1; JP 22011-68881 A.

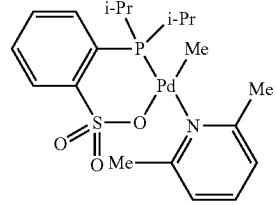

Comparative metal complex 2 i-Pr = isopropyl

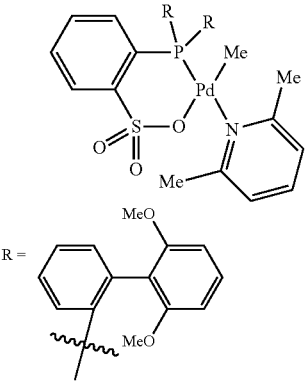

Comparative metal complex 3

[Synthesis of Polymer]
(Co)polymerization of olefin was conducted using metal complex catalyst 1 and comparative metal complexes 1 to 3 synthesized by the above-mentioned method. The polymerization conditions and polymerization results are shown in Tables 1 to 5, respectively.

Here, the catalyst concentration and the catalytic activity were calculated by the following formulae.

Catalyst concentration (mmol/l)=Molar number of the used metal complex catalyst (mmol)×1000/(toluene volume (ml)+volume of the polar group-containing monomer (ml))

Catalytic activity (g/mmol·h)=Yield of the obtained copolymer (g)/(Molar number of the used metal complex catalyst (mmol)×reaction time (h))

Example 1: Homopolymerization of Ethylene Using Metal Complex 1 (Preparation of Polymer 1)

Toluene (75 ml) was added to a 120 ml-volume autoclave containing metal complex catalyst 1 (3.9 mg, 0.0050 mmol) under argon atmosphere. After filling the autoclave with ethylene (3.0 MPa), the content of the autoclave was stirred at 80° C. for one hour. After cooling the autoclave to room temperature, the reaction solution in the autoclave was added to methanol (300 ml) to precipitate a polymer. The generated polymer was collected by filtration, washed with methanol and dried under reduced pressure to obtain polymer 1. The yield was 3.8 g. The catalytic activity was calculated to be 760 g/(mmol·h). The molecular weight of polymer 1 was determined by the above-described Method A, and the number average molecular weight and weight average molecular weight of the polymer were calculated 852,000 and 1,636,000, respectively, and Mw/Mn was 1.9. The polymerization conditions and polymerization results are shown in Tables 1 and 2.

Comparative Example 1: Homopolymerization of Ethylene Using Comparative Metal Complex 1 (Preparation of Comparative Polymer 1)

The homopolymerization of ethylene was conducted in the same way as in Example 1 using comparative metal complex 1 instead of metal complex 1 to obtain comparative polymer 1. The yield was 2.4 g. The catalytic activity was calculated to be 480 g/(mmol·h). The molecular weight of comparative polymer 1 was determined by the above-described Method A, and the number average molecular weight and weight average molecular weight of the polymer were calculated 352,000 and 747,000, respectively, and Mw/Mn was 2.1. The polymerization conditions and polymerization results are shown in Tables 1 and 2.

Example 2: Copolymerization of Allyl Acetate and Ethylene Using Metal Complex 1 (Preparation of Polymer 2)

Allyl acetate (75 ml, 700 mmol) was added to a 120 ml-volume autoclave containing metal complex catalyst (7.7 mg, 0.010 mmol) under nitrogen atmosphere. After filling the autoclave with ethylene (4.0 MPa), the content of the autoclave was stirred at 80° C. for five hours. After cooling the autoclave to room temperature, the reaction solution in the autoclave was added to methanol (300 ml) to precipitate a copolymer. The generated copolymer was collected by filtration, washed with methanol and dried under reduced pressure to obtain polymer 2. The yield was 2.3 g. The catalytic activity was calculated to be 46 g/(mmol·h). The molecular weight of polymer 2 was determined by the above-described Method A, and the number average molecular weight and weight average molecular weight of the polymer were calculated 220,000 and 540,000, respectively, and Mw/Mn was 2.5. The allyl acetate content in the copolymer was determined to be 100:3.0 (molar fraction of allyl acetate=2.9%) by molar ratio of ethylene:allyl acetate by $^1$H-NMR measurement. The polymerization conditions and polymerization results are shown in Tables 1 and 2.

Example 3: Copolymerization of Allyl Acetate and Ethylene Using Metal Complex 2 (Preparation of Polymer 3)

Copolymerization of allyl acetate and ethylene was conducted in the same way as in Example 2 using metal complex 2 instead of metal complex 1. As a result, polymer 3 was obtained. The yield was 1.6 g. The catalytic activity was calculated to be 32 g/(mmol·h). The molecular weight of polymer 3 was determined by the above-described Method A, and the number average molecular weight and weight average molecular weight of the polymer were calculated 168,000 and 390,000, respectively, and Mw/Mn was 2.3. The allyl acetate content in the copolymer was determined by Method C and found to be 100:3.7 (molar fraction of allyl acetate=3.6%) by molar ratio of ethylene: allyl acetate. The polymerization conditions and polymerization results are shown in Tables 1 and 2.

Comparative Examples 2 to 4: Copolymerization of Allyl Acetate and Ethylene Using Comparative Metal Complexes 1 to 3 (Preparation of Comparative Polymers 2 to 4)

Copolymerization of allyl acetate and ethylene was conducted in the same way as in Example 2 using comparative metal complexes 1 to 3 instead of metal complex 1. The polymerization conditions and polymerization results are shown in Tables 1 and 2.

TABLE 1

| | Catalyst | | | Ethylene | Formula (1) allyl acetate | Solvent | | Catalyst cocentration | Reaction temperature | Reaction time |
|---|---|---|---|---|---|---|---|---|---|---|
| | Kind | mg | mmol | MPa | ml | kind | ml | mmol/l | ° C. | h |
| Example 1 | Metal complex 1 | 3.9 | 0.0050 | 3.0 | 0 | Toluene | 75 | 0.067 | 80 | 1 |
| Comparative Example 1 | Comparative metal complex 1 | 3.5 | 0.0050 | 3.0 | 0 | Toluene | 75 | 0.067 | 80 | 1 |
| Example 2 | Metal complex 1 | 7.7 | 0.010 | 4.0 | 75 | N/A | 0 | 0.13 | 80 | 5 |
| Example 3 | Metal complex 2 | 8.1 | 0.010 | 4.0 | 75 | N/A | 0 | 0.13 | 80 | 5 |
| Comparative Example 2 | Comparative metal complex 1 | 6.9 | 0.010 | 4.0 | 75 | N/A | 0 | 0.13 | 80 | 5 |
| Comparative Example 3 | Comparative metal complex 2 | 5.0 | 0.010 | 4.0 | 75 | N/A | 0 | 0.13 | 80 | 5 |
| Comparative Example 4 | Comparative metal complex 3 | 84.2 | 0.10 | 4.0 | 37.5 | Toluene | 37.5 | 1.3 | 80 | 5 |

TABLE 2

| Examples | Polymer No. | Polymer yield (g) | Catalyst Activity (g/mmol · h) | Molecular weight | | | Molar fraction of allyl acetate (mol %) |
|---|---|---|---|---|---|---|---|
| | | | | Mn | Mw | Mw/Mn | |
| Example 1 | 1 | 3.8 | 760 | 852,000 | 1,636,000 | 1.9 | 0 |
| Comparative Example 1 | Comparative 1 | 2.4 | 480 | 352,000 | 747,000 | 2.1 | 0 |
| Example 2 | 2 | 2.3 | 46 | 220,000 | 540,000 | 2.5 | 2.9 |
| Example 3 | 3 | 1.6 | 32 | 168,000 | 390,000 | 2.3 | 3.6 |
| Comparative Example 2 | Comparative 2 | 1.4 | 29 | 240,000 | 680,000 | 2.8 | 3.0 |
| Comparative Example 3 | Comparative 3 | 1.1 | 22 | 11,000 | 24,000 | 2.1 | 4.3 |
| Comparative Example 4 | Comparative 4 | 0.21 | 0.42 | 37,000 | 85,000 | 2.3 | 1.2 |

As in Tables 1 and 2, high molecular weight polymers having a weight average molecular weight Mw of hundreds of thousands or more were able to be synthesized in Example 1, Example 2 and Example 3 by using metal complex catalyst 1 and metal complex 2 of the present invention with a higher catalytic activity than the case of using a conventional catalyst (Comparative Examples 1 to 4).

Example 4: Copolymerization of Allyl Acetate and Ethylene (Preparation of Polymer 4)

The copolymerization of allyl acetate and ethylene was conducted in a similar manner in Example 2 by changing the volume ratio of toluene and allyl acetate, ethylene pressure, reaction scale and reaction time as in Table 3. That is, allyl acetate (150 ml, 1,400 mmol) and toluene (150 ml) were added to a 500 ml-volume autoclave containing metal complex catalyst 1 (30.7 mg, 0.040 mmol) under nitrogen atmosphere. After filling the autoclave with ethylene (1.65 MPa), the content of the autoclave was stirred at 80° C. for 14 hours. After cooling the autoclave to room temperature, the reaction solution in the autoclave was added to methanol (1 l) to precipitate a copolymer. The generated copolymer was collected by filtration, washed with methanol and dried under reduced pressure to obtain polymer 4. The results are shown in Table 4.

Example 5: Copolymerization of Allyl Acetate and Ethylene (Preparation of Polymer 5)

The copolymerization of allyl acetate and ethylene was conducted in a similar manner in Example 4 by changing the ethylene pressure and reaction time as in Table 3 without using toluene as a solvent. That is, allyl acetate (300 ml, 2,800 mmol) was added to a 500 ml-volume autoclave containing metal complex catalyst 1 (30.7 mg, 0.040 mmol) under nitrogen atmosphere. After filling the autoclave with ethylene (2.5 MPa), the content of the autoclave was stirred at 80° C. for 12 hours. After cooling the autoclave to room temperature, the reaction solution in the autoclave was added to methanol (1 l) to precipitate a copolymer. The generated copolymer was collected by filtration, washed with methanol and dried under reduced pressure to obtain polymer 5. The results are shown in Table 4.

Example 6: Copolymerization of Allyl Acetate and Ethylene (Preparation of Polymer 6 and Comparative Polymer 5)

The copolymerization of allyl acetate and ethylene was conducted in a similar manner in Example 5 by changing the ethylene pressure, reaction time and catalyst as in Table 3. The results are shown in Table 4.

Example 11: Copolymerization of Allyl Acetate and Ethylene (Preparation of Polymer 11)

The copolymerization of allyl acetate and ethylene was conducted in a similar manner in Example 4 by changing the ethylene pressure and reaction time as in Table 3. The results are shown in Table 4.

Example 12: Copolymerization of Allyl Acetate and Ethylene (Preparation of Polymer 12)

The copolymerization of allyl acetate and ethylene was conducted in a similar manner in Example 5 by changing the catalyst concentration, ethylene pressure and reaction time as in Table 3. The results are shown in Table 4.

TABLE 3

| | Catalyst | | | Ethylene | Formula (1) allyl acetate | Solvent | | Catalyst cocentration | Reaction temperature | Reaction time |
|---|---|---|---|---|---|---|---|---|---|---|
| | Kind | mg | mmol | MPa | ml | kind | ml | mmol/l | ° C. | h |
| Example 4 | Metal complex 1 | 30.7 | 0.040 | 1.65 | 150 | Toluene | 150 | 0.13 | 80 | 14 |
| Example 5 | Metal complex 1 | 30.7 | 0.040 | 2.5 | 300 | N/A | 0 | 0.13 | 80 | 12 |
| Example 6 | Metal complex 1 | 30.7 | 0.040 | 3.0 | 300 | N/A | 0 | 0.13 | 80 | 22 |
| Example 11 | Metal complex 1 | 30.7 | 0.040 | 2.0 | 150 | Toluene | 150 | 0.13 | 80 | 18 |

TABLE 3-continued

| | Catalyst | | | Ethylene | Formula (1) allyl acetate | Solvent | | Catalyst cocentration | Reaction temperature | Reaction time |
|---|---|---|---|---|---|---|---|---|---|---|
| | Kind | mg | mmol | MPa | ml | kind | ml | mmol/l | °C. | h |
| Example 12 | Metal complex 1 | 46.0 | 0.060 | 1.7 | 300 | N/A | 0 | 0.20 | 80 | 27 |
| Comparative Example 5 | Comparative metal complex 2 | 27.8 | 0.040 | 3.0 | 300 | N/A | 0 | 0.13 | 80 | 72 |

TABLE 4

| Examples | Polymer No. | Polymer yield (g) | Catalyst Activity (g/mmol · h) | Molecular weight | | | Molar fraction of allyl acetate (mol %) |
|---|---|---|---|---|---|---|---|
| | | | | Mn | Mw | Mw/Mn | |
| Example 4 | 3 | 3.4 | 6.1 | 86,000 | 180,000 | 2.1 | 5.1 |
| Example 5 | 4 | 5.4 | 11 | 88,000 | 210,000 | 2.4 | 6.0 |
| Example 6 | 5 | 7.7 | 8.1 | 140,000 | 330,000 | 2.3 | 4.3 |
| Example 11 | 11 | 5.0 | 6.9 | 101,000 | 200,000 | 2.0 | 4.8 |
| Example 12 | 12 | 3.0 | 1.9 | 33,000 | 72,000 | 2.2 | 10.4 |
| Comparative Example 4 | Comparative 5 | 5.5 | 3.8 | 270,000 | 690,000 | 2.6 | 3.4 |

When compared to Comparative Example 5, it was possible to produce polymers having a weight average molecular weight (Mw) of 180,000 to 330,000, which is within the range that enables excellent moldability in Examples 4 to 6 using metal complex 1 of the present invention. Also, it was revealed that the allyl acetate content in the copolymer had been increased. Despite that the conditions such as the amount of the used catalyst and the reaction temperature in Comparative Example 5 were the same as in those in Examples, it turned out that the polymer obtained in Comparative Example 5 had a high molecular weight and a low catalytic activity. The molecular weight of the polymer is too high and leads to inferior moldability. The polymer of Example 12 had a low molecular weight but attained an allyl acetate content of 10 mol % or more.

Referential Example 1: Comparison of Stability at a High Temperature Between Metal Complex 1 and Comparative Metal Complex 1 of the Present Invention A comparison experiment was conducted on the stability at a high temperature between metal complex 1 and comparative metal complex 1. 10 ml of toluene solutions (5 mmol/l) of metal complex 1 and comparative metal complex 1 were prepared under nitrogen gas atmosphere. After heating each of the solutions in an oil bath of 150° C. for five minutes, toluene was distilled away and the residues were dissolved in chloroform-d and subjected to $^{31}$P-NMR measurement. In the case of metal complex 1, no change in the peak was observed before and after the heating at 150° C. (no decomposition). In the case of comparative metal complex 1, precipitation of Pd black was observed after the heating and multiple peaks presumed to be derived from the decomposed product (611.0, 13.8, 14.6 ppm) were observed other than the peak derived from comparative metal complex 1 (616.7 ppm). The abundance ratios of these products were calculated to be 5% of comparative metal complex 1, 2% of 611.0 ppm, 5% of 13.8 ppm and 88% of 14.6 ppm from the proportional integral. It was revealed that metal complex 1 of the present invention is superior to comparative metal complex 1 in terms of stability at a high temperature.

Example 7: Copolymerization of Allyl Acetate and Ethylene (Preparation of Polymer 7)

Allyl acetate (75 ml, 700 mmol) was added to a 120 ml-volume autoclave containing metal complex catalyst (7.7 mg, 0.010 mmol) under nitrogen atmosphere. After heating the autoclave to 150° C. and filling the autoclave with ethylene (4.0 MPa), the content of the autoclave was stirred for 0.5 hour. After cooling the autoclave to room temperature, the reaction solution in the autoclave was distilled away to collect the residue. The residue was dried under reduced pressure to obtain polymer 7. The polymerization conditions and results are shown in Table 5.

Comparative Example 6: Copolymerization of Allyl Acetate and Ethylene (Preparation of Comparative Polymer 6)

Copolymerization of allyl acetate and ethylene was conducted in the same way as in Example 7 by using comparative metal complex 1 instead of metal complex 1. That is, allyl acetate (75 ml, 700 mmol) was added to a 120 ml-volume autoclave containing comparative metal complex 1 (6.9 mg, 0.010 mmol) under nitrogen atmosphere. After heating the autoclave to 150° C. and filling the autoclave with ethylene (4.0 MPa), the content of the autoclave was stirred for 0.5 hour. After cooling the autoclave to room temperature, the reaction solution in the autoclave was distilled away to collect the residue. The residue was dried under reduced pressure to obtain comparative polymer 6. The yield was 0.01 g. The catalytic activity was calculated to be 2.6 g/(mmol·h). Since the amount of the collected polymer was small, it was difficult to conduct various analyses. The polymerization conditions and results are shown in Table 5.

TABLE 5

| | Catalyst | | | Ethylene | Formula (1) allyl acetate | Solvent | | Catalyst cocentration | Reaction temperature | Reaction time | Polymer | Yield | Catalytic activity |
|---|---|---|---|---|---|---|---|---|---|---|---|---|---|
| | Kind | mg | mmol | MPa | ml | kind | ml | mmol/l | °C. | h | No. | g | g/mmol · h |
| Ex. 7 | Metal complex 1 | 7.7 | 0.010 | 4.0 | 75 | N/A | 0 | 0.13 | 150 | 0.5 | 7 | 0.33 | 66 |
| Comparative Ex. 6 | Comparative metal complex 2 | 6.9 | 0.010 | 4.5 | 75 | N/A | 0 | 0.13 | 150 | 0.5 | Comparative 6 | 0.01 | 2.6 |

As can be seen from Example 7, Comparative Example 6 and Referential Example 1, metal complex 1 used as a catalyst in the present invention is superior in thermal stability compared to comparative metal complex 1 and exhibits high polymerization activity in a high temperature range. That is, it makes it possible to increase the polymer production per catalyst by raising the reaction temperature to thereby decrease the production cost.

In addition, acrylic acid ester was used as a polar group-containing vinyl monomer represented by formula (1) and copolymerization with ethylene was conducted.

Example 8: Copolymerization of Methyl Acrylate and Ethylene (Preparation of Polymer 8)

Copolymerization of methyl acrylate and ethylene was conducted by using metal complex catalyst 1. A catalyst slurry was prepared by treating the 30 ml-volume flask containing metal complex catalyst 1 (7.7 mg, 0.010 mmol) and toluene (10 ml) with an ultrasonic vibrator under nitrogen atmosphere for 10 minutes. Next, toluene and methyl acrylate (concentration at the time of polymerization: 1 mol/l, total fluid volume: 700 ml) was introduced into a stainless-steal autoclave with an induction stirrer having an internal volume of one liter under nitrogen atmosphere. The catalyst slurry prepared in advance was added thereto and polymerization was started at 80° C. with ethylene pressure of 3 MPa. During the reaction, the temperature was maintained at 80° C. and ethylene was continuously supplied so that the ethylene partial pressure was maintained at 3.0 MPa. After the completion of the polymerization, ethylene was purged, the autoclave was cooled to room temperature, and the polymer and the solvent was separated by filtration. Furthermore, the polymer was precipitated again by using acetone (1 l) and the precipitated polymer was filtrated. The obtained solid polymer was dispersed in acetone (1 l) and 1N-hydrochloric acid (20 ml) was added thereto. The solution was stirred for one hour and the polymer was filtrated. The obtained solid polymer was washed with a small amount of acetone and dried under reduced pressure at 60° C. for three hours to obtain polymer 8. The yield was 11.0 g and the catalytic activity was calculated to be 110 g/(mmol·h). The molecular weight of polymer 8 was determined by Method B, and the weight average molecular weight Mw was calculated to be 129,000 and Mw/Mn was 1.7. The melting point was 120.4° C. The methyl acrylate intake was determined by Method D and was 1.3 mol %.

Example 9: Copolymerization of t-Butyl Acrylate and Ethylene (Preparation of Polymer 9)

Copolymerization of t-butyl acrylate and ethylene was conducted. Toluene (10 ml) was added to a 30 ml-volume flask containing bis(cyclooctadiene)nickel (275.1 mg, 1.0 mmol) and phosphorylated sulfonic acid ligand 1e (538.8 mg, 1.0 mmol) and a catalyst slurry was prepared. Next, toluene and t-butyl acrylate (concentration at the time of polymerization: 0.15 mol/l, total fluid volume: 700 ml) was introduced into a stainless-steal autoclave with an induction stirrer having an internal volume of one liter under nitrogen atmosphere. The catalyst slurry prepared in advance was added thereto and polymerization was started at 40° C. with ethylene pressure of 3.0 MPa. During the reaction, the temperature was maintained at 40° C. and ethylene was continuously supplied so that the ethylene partial pressure was maintained at 3.0 MPa. After the completion of the polymerization, ethylene was purged and the autoclave was cooled to room temperature. The polymer was precipitated again by using acetone (1 l) and the precipitated polymer was filtrated. The obtained solid polymer was dispersed in acetone (1 l) and 1N-hydrochloric acid (10 ml) was added thereto. The solution was stirred for one hour and the polymer was filtrated. The obtained solid product was washed with acetone and dried under reduced pressure at 60° C. for three hours to obtain polymer 9. The yield was 0.20 g and the catalytic activity was calculated to be 0.20 g/(mmol·h). The molecular weight of polymer 9 was determined by Method B, and the weight average molecular weight Mw was calculated to be 29,000 and Mw/Mn was 3.0. The melting point was 132.2° C.

Example 10: Copolymerization of t-Butyl Acrylate and Ethylene (Preparation of Polymer 10)

Copolymerization of t-butyl acrylate and ethylene was conducted in the same way as in Example 9 except that phosphorylated sulfonic acid ligand 1e was changed to compound 2e. As a result, polymer 10 was obtained. The yield was 3.1 g and the catalytic activity was calculated to be 3.1 g/(mmol·h). The molecular weight of polymer 10 was determined by Method B, and the weight average molecular weight Mw was calculated to be 50,000 and Mw/Mn was 2.8. The melting point was 132.3° C. The t-butyl acrylate intake was determined by Method D and was 0.4 mol %.

Example 13: Saponification Reaction of an Allyl Acetate-Ethylene Copolymer (Preparation of Polymer 13)

Saponification reaction of the allyl acetate-ethylene copolymer synthesized under the same conditions as described in Example 11 (the number average molecular weight and weight average molecular weight of the polymer were 101,000 and 201,000, respectively, and Mw/Mn=2.0 determined by Method A and the allyl acetate content=4.8 mol % determined by Method C) was conducted. That is, while a 2 l-volume separable flask provided with a reflux line that contained an allyl acetate-ethylene copolymer (25.1 g), toluene (1,050 ml) and ethanol (400 ml) was heated to 90° C., the solution was stirred with an induction stirrer until the allyl acetate-ethylene copolymer was dissolved. An ethanol solution (40 ml) of sodium hydroxide (0.15 g, 3.8 mmol) was added to the solution, and the resultant was further stirred at 90° C. for four hours. After the solution was cooled to room temperature, the reaction solution was added to methanol (3 l) containing 37% hydrochloric acid (1 ml). The precipitated copolymer was collected by filtration, washed with methanol and then dried under reduced pressure to obtain an allyl alcohol-ethylene copolymer (polymer 13). The yield was 23.3 g. It was confirmed by $^1$H-NMR measurement that the —OC(=O)CH$_3$ group derived from the allyl acetate unit in the raw material was converted to —OH group and the saponification reaction proceeded to completion. The molecular weight of polymer 13 was determined by Method A and the number average molecular weight and the weight average molecular weight were calculated to be 86,000 and 190,000, respectively, and Mw/Mn was 2.2. The allyl alcohol content in the copolymer was determined by Method C and the molar ratio of ethylene to allyl alcohol was 100:4.7 (molar fraction of allyl alcohol=4.5%). The melting point was 106.0° C.

Example 14: Saponification of Allyl Acetate-Ethylene Copolymer (Preparation of Polymer 14)

Saponification reaction of the allyl acetate-ethylene copolymer synthesized under the same conditions as described in Example 12 (the number average molecular weight and weight average molecular weight of the polymer were 33,000 and 72,000, respectively, and Mw/Mn=2.2 determined by Method A and the allyl acetate content=10.4 mol % determined by Method C) was conducted. The conditions are shown in Table 6 and the results are shown in Table 7.

The invention claimed is:

1. A method for producing a homopolymer of ethylene, or a copolymer of ethylene and a monomer comprising a polar group-containing olefin represented by formula (1),

(1)

in the formula, R$^1$ represents a substituent group selected from the group consisting of a hydroxyl group, an alkoxy group having 1 to 10 carbon atoms, an aryloxy group having 6 to 20 carbon atoms, an acyl group having 2 to 10 carbon atoms, an ester group having 2 to 10 carbon atoms, an acyloxy group having 2 to 10 carbon atoms, an amino group, a substituted amino group having 1 to 12 carbon atoms, a substituted amide group having 2 to 12 carbon atoms, a substituted pyridyl group having 5 to 10 carbon atoms, a substituted pyrrolidyl group having 4 to 10 carbon atoms, a substituted piperidyl group having 5 to 10 carbon atoms, a substituted hydrofuryl group having 4 to 10 carbon atoms, a substituted imidazolyl group having 4 to 10 carbon atoms, a mercapto group, an alkylthio group having 1 to 10 carbon atoms, an arylthio group having 6 to 10 carbon atoms, an epoxy group, and a halogen atom, and n is an integer from 0 to 6, the method comprising polymerizing ethylene, or ethylene and the monomer comprising a polar group-containing olefin represented by formula (1), in the presence of a metal complex represented by formula (C2) as a polymerization catalyst,

TABLE 6

| | Material polymer | | | | | | | | | |
|---|---|---|---|---|---|---|---|---|---|---|
| | Weight | Molecular weight | | | Content of allyl acetate unit | Base Sodium hydroxide | | Solvent | | Conditions | |
| | | | | | | | | Ethanol | Toluene | Temperature | Time |
| | g | Mn | Mw | Mw/Mn | mol % | g | mmol | ml | ml | ° C. | h |
| Ex. 13 | 25.1 | 101,000 | 201,000 | 2.0 | 4.8 | 0.15 | 3.8 | 440 | 1,050 | 90 | 4 |
| Ex. 14 | 7.9 | 33,000 | 72,000 | 2.2 | 10.4 | 0.092 | 2.3 | 420 | 1,000 | 90 | 4 |

TABLE 7

| | Polymer No. | Yield g | Molecular weight | | | Content of allyl acetate unit mol % | Melting point ° C. | Saponification rate % |
|---|---|---|---|---|---|---|---|---|
| | | | Mn | Mw | Mw/Mn | | | |
| Ex. 13 | 13 | 23.3 | 86,000 | 190,000 | 2.2 | 4.5 | 106.0 | 100 |
| Ex. 14 | 14 | 6.2 | 19,000 | 48,000 | 2.5 | 10.4 | 88.8 | 100 |

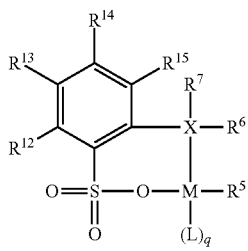

(C2)

in the formula, M represents a metal atom of group 10 element in the periodic system;

X represents a phosphorous (P) atom or an arsenic (As) atom;

$R^5$ represents a substituent group selected from the group consisting of a hydrogen atom, a halogen atom, a hydrocarbon group having 1 to 30 carbon atoms, a hydrocarbon group having 1 to 30 carbon atoms substituted by a halogen atom, a hydrocarbon group having 2 to 30 carbon atoms substituted by an alkoxy group having 1 to 10 carbon atoms, a hydrocarbon group having 7 to 30 carbon atoms substituted by an aryloxy group having 6 to 20 carbon atoms, a hydrocarbon group having 3 to 30 carbon atoms substituted by an amide group having 2 to 10 carbon atoms, an alkoxy group having 1 to 30 carbon atoms, an aryloxy group having 6 to 30 carbon atoms, and an acyloxy group having 2 to 10 carbon atoms;

$R^6$ and $R^7$ independently represent a hydrogen atom, an alkoxy group, an aryloxy group, a silyl group, an amino group or a hydrocarbon group having 1 to 120 carbon atoms which may be substituted by one or more groups selected from a halogen atom, an alkoxy group and an aryloxy group; and at least one of $R^6$ and $R^7$ represents an alkyl group having 1 to 10 carbon atoms or a cycloalkyl group having 4 to 106 carbon atoms;

$R^{12}$ to $R^{15}$ each independently represents a hydrogen atom, a silyl group, a halogen atom, a hydrocarbon group having 1 to 20 carbon atoms, an alkoxy group having 1 to 8 carbon atoms, an aryloxy group having 6 to 20 carbon atoms, or a hydrocarbon group having 1 to 20 carbon atoms substituted by a silyl group or a halogen atom, at least one of $R^{12}$ to $R^{15}$ is a silyl group;

L represents an electron-donating ligand, and q is 0, ½, 1 or 2.

2. The method for producing a polymer as claimed in claim 1, wherein n in formula (1) is 0.

3. The method for producing a polymer as claimed in claim 1, wherein n in formula (1) is 1.

4. The method for producing a polymer as claimed in claim 1, wherein the copolymer is a copolymer of ethylene, a polar group-containing olefin represented by formula (1) and α-olefin represented by formula (2), $$CH_2=CHR^2 \quad (2)$$

in the formula, $R^2$ represents a hydrocarbon group having 1 to 20 carbon atoms; and the molar ratios of l, m and p of the monomer units represented by formula (3), formula (4) and formula (5), each corresponding to ethylene, a monomer represented by formula (1) and a monomer represented by formula (2), respectively, satisfies the relationship expressed by the following equation:

$$\{l/(l+p)\}\times 100 \geq 60,$$

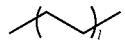

(3)

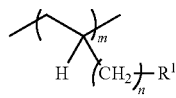

(4)

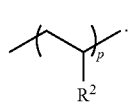

(5)

5. The method for producing a polymer as claimed in claim 1, wherein formula (C2) is represented by formula (C3), in which $R^{12}$ in formula (C2) is a silyl group,

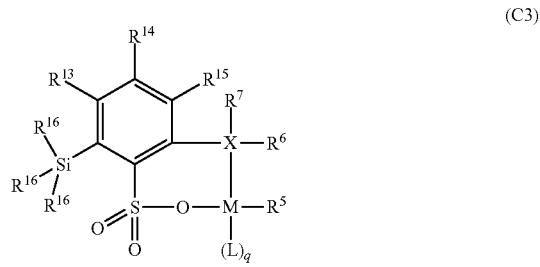

(C3)

in the formula, three $R^{16}$'s independently represent a hydrogen atom or a hydrocarbon group having 1 to 8 carbon atoms and may be the same or different from each other, M, X, $R^5$, $R^6$, $R^7$, $R^{13}$, $R^{14}$, $R^{15}$, L and q have the same meanings as described in formula (C2).

6. The method for producing a polymer as claimed in claim 5, wherein all the $R^{16}$'s in formula (C3) are a methyl group.

7. The method for producing a polymer as claimed in claim 5, wherein $R^{13}$ in formula (C3) is a hydrogen atom or a hydrocarbon group having 1 to 6 carbon atoms.

8. The method for producing a polymer as claimed in claim 5, wherein $R^{13}$ in formula (C3) is a hydrogen atom, an isopropyl group or a phenyl group.

9. The method for producing a polymer as claimed in claim 5, wherein both of $R^{14}$ and $R^{15}$ in formula (C3) are a hydrogen atom.

10. A method for producing a hydroxyl group-containing copolymer, comprising producing a copolymer from ethylene and a polar group-containing olefin according to the method claimed in claim 1, in which $R^1$ in formula (1) is an acyloxy group having 2 to 10 carbon atoms, and subjecting the copolymer to a saponification reaction or a hydrolysis reaction.

11. A catalyst for polymerization of olefin, containing a metal complex represented by formula (C2),

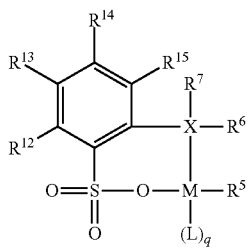

(C2)

in the formula, M represents a metal atom of group 10 element in the periodic system;

X represents a phosphorous (P) atom or an arsenic (As) atom;

$R^5$ represents a substituent group selected from the group consisting of a hydrogen atom, a halogen atom, a hydrocarbon group having 1 to 30 carbon atoms, a hydrocarbon group having 1 to 30 carbon atoms substituted by a halogen atom, a hydrocarbon group having 2 to 30 carbon atoms substituted by an alkoxy group having 1 to 10 carbon atoms, a hydrocarbon group having 7 to 30 carbon atoms substituted by an aryloxy group having 6 to 20 carbon atoms, a hydrocarbon group having 3 to 30 carbon atoms substituted by an amide group having 2 to 10 carbon atoms, an alkoxy group having 1 to 30 carbon atoms, an aryloxy group having 6 to 30 carbon atoms, and an acyloxy group having 2 to 10 carbon atoms;

$R^6$ and $R^7$ independently represent a hydrogen atom, an alkoxy group, an aryloxy group, a silyl group, an amino group or a hydrocarbon group having 1 to 120 carbon atoms which may be substituted by one or more groups selected from a halogen atom, an alkoxy group and an aryloxy group; and at least one of $R^6$ and $R^7$ represents an alkyl group having 1 to 10 carbon atoms or a cycloalkyl group having 4 to 106 carbon atoms;

$R^{12}$ to $R^{15}$ each independently represents a hydrogen atom, a silyl group, a halogen atom, a hydrocarbon group having 1 to 20 carbon atoms, an alkoxy group having 1 to 8 carbon atoms, an aryloxy group having 6 to 20 carbon atoms, or a hydrocarbon group having 1 to 20 carbon atoms substituted by a silyl group or a halogen atom, at least one of $R^{12}$ to $R^{15}$ is a silyl group;

L represents an electron-donating ligand, and q is 0, ½, 1 or 2.

* * * * *